United States Patent
Salem

(10) Patent No.: US 10,474,767 B2
(45) Date of Patent: Nov. 12, 2019

(54) GRAVITY MODELING A RIFTED CONTINENTAL MARGIN

(71) Applicant: Saudi Arabian Oil Company, Dhahran (SA)

(72) Inventor: Ahmed Salem, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 409 days.

(21) Appl. No.: 15/007,035

(22) Filed: Jan. 26, 2016

(65) Prior Publication Data

US 2017/0212971 A1    Jul. 27, 2017

(51) Int. Cl.
G06F 17/50    (2006.01)
G01V 7/00    (2006.01)
G01V 99/00    (2009.01)

(52) U.S. Cl.
CPC ............ *G06F 17/5009* (2013.01); *G01V 7/00* (2013.01); *G01V 99/00* (2013.01)

(58) Field of Classification Search
None
See application file for complete search history.

(56) References Cited

U.S. PATENT DOCUMENTS

| 4,783,742 | A | * | 11/1988 | Peters | .................. | E21B 47/022 |
| | | | | | | 33/304 |
| 4,821,164 | A | | 4/1989 | Swanson | | |
| 5,355,313 | A | | 10/1994 | Moll et al. | | |
| 7,164,619 | B2 | | 1/2007 | Robertsson et al. | | |
| 7,328,107 | B2 | | 2/2008 | Strack et al. | | |
| 8,938,373 | B2 | | 1/2015 | Wienecke | | |
| 2012/0271609 | A1 | | 10/2012 | Laake et al. | | |
| 2014/0350905 | A1 | * | 11/2014 | Wienecke | .............. | G01V 11/00 |
| | | | | | | 703/2 |

(Continued)

FOREIGN PATENT DOCUMENTS

| GB | 2497576 | 6/2013 |
| JP | 2000346952 | 12/2000 |
| WO | WO2012060888 | 5/2012 |

OTHER PUBLICATIONS

Condi et al., "Gravity Inversion for Rifted Margin Deep Structure using Extension and Isostatic Contraints", Geophys. J. Int., published in 1999, 138, pp. 435-446.

(Continued)

*Primary Examiner* — Craig C Dorais
(74) *Attorney, Agent, or Firm* — Fish & Richardson P.C.

(57) ABSTRACT

Example computer-implemented methods, computer-readable media, and computer systems are described for performing gravity modeling. In some aspects, survey data that includes gravity data of a rifted continental margin is accessed. A value of a geometric parameter is determined, which corresponds to a desired value of a Mohorovicic Discontinuity (Moho) uplift at a specified location of the rifted continental margin. A Moho surface is determined based on a value of Moho uplift at a rift center that is determined based on the value of the geometric parameter. A top basement surface is determined based on a residual gravity data associated with the Moho surface. A crustal model of the rifted continental margin is output. The crustal model includes the Moho surface and the top basement surface of the rifted continental margin.

20 Claims, 15 Drawing Sheets

(56) References Cited

U.S. PATENT DOCUMENTS

2014/0365193 A1   12/2014   Biegert et al.

OTHER PUBLICATIONS

Falvey, "Isostatic Contraints in 2-D Gravity Modelling", Dept. of Geology and Geophysics, vol. 8, No. 4, Dec. 1977, pp. 106-110.
Salem et al., "Inversion of Gravity Data with Isostatic Constraints", Geophysics, vol. 79, No. 6, Nov.-Dec. 2014, pp. A45-A50.
Shaw, "A Two-Dimensional Gravity Interpretation of a Continental Margin Setting", Bull. Aust. Soc. Explor. Geophys. vol. 8, No. 4, Dec. 1977, pp. 129-133.
Nguyen et al., "Topography of the Moho and Earth Crust Structure beneath the East Vietnam Sea from 3D Inversion of Gravity Field Data"; Acta Geophysica Central European Science Journals; vol. 61, No. 2; Nov. 12, 2012; pp. 357-384.
Ahmed Salem et al., "Inversio of Gravity Data with Isostatic Constraints"; Geophysics, vol. 79, No. 6; Novmeber Dec. 2014; pp. A45-A50.
Alan R.A. Aitken, "Moho Geometry Gravity Inversion Experiment (MoGGIE): A Refined Model of the Australian Moho and Its Tectonic and Isostatic Implications"; Earth and Planetary Science Letters; vol. 297, No. 1-2; Aug. 1, 2010; pp. 71-83.
International Search Report and Written Opinion of the International Searching Authority issued in International Application No. PCT/US2016/063919 dated May 24, 2017; 11 pages.

* cited by examiner

GRAVITY MODELING A RIFTED CONTINENTAL MARGIN

TECHNICAL FIELD

This disclosure relates to providing information on the structure of a region of the Earth based on gravity data.

BACKGROUND

Gravity data can be acquired using ground, marine, airborne, satellite, or other platforms and is important for hydrocarbon exploration efforts. Gravity anomalies from density variations within Earth's crust have been used to study crustal structure. Typical gravity anomalies used for such studies include free-air gravity anomalies that are only corrected for height of the measurements and Bouguer anomalies that have been corrected for both height of the measurements and mass distributions. Interpretation of gravity anomalies over rifted continental margins can be challenging because these anomalies are complicated in their shape and reduced in amplitude due to regional gravity anomalies associated with the positive density contrast at top upper mantle Mohorovicic Discontinuity ("Moho").

SUMMARY

This disclosure relates to gravity modeling a rifted continental margin.

In general, example innovative aspects of the subject matter described here can be implemented as a computer-implemented method, implemented in a computer-readable media, or implemented in a computer system, for gravity modeling a region of the Earth.

One computer-implemented method includes accessing, by operation of a computer system, survey data that includes gravity data of a rifted continental margin; determining, by operation of the computer system, a value of a geometric parameter that corresponds to a desired value of a Mohorovicic Discontinuity (Moho) uplift at a specified location of the rifted continental margin; determining, by operation of the computer system, a Moho surface based on a value of Moho uplift at a rift center, the value of Moho uplift at the rift center determined based on the value of the geometric parameter; determining, by operation of the computer system, a top basement surface based on a residual gravity data associated with the Moho surface; and outputting, by operation of the computer system, a crustal model of the rifted continental margin, the crustal model including the Moho surface and the top basement surface of the rifted continental margin.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising: calculating a gravity response of the Moho surface; and calculating the residual gravity response associated with the Moho surface.

A second aspect, combinable with the general implementation, wherein the value of Moho uplift at the rift center is determined based further on a known depth to the Moho.

A third aspect, combinable with the general implementation, wherein determining a Moho surface based on a value of Moho uplift at a rift center comprises: determining a plurality of candidate Moho surfaces based on a plurality of candidate values of Moho uplift at the rift center; calculating a plurality of candidate depths to the top basement for the plurality of candidate Moho surfaces; and identifying a best candidate Moho surface based on a misfit between the plurality of candidate depths of the top basement and a known depth to the top basement.

A fourth aspect, combinable with the general implementation, wherein determining a Moho surface based on a value of Moho uplift at a rift center comprises: determining a plurality of candidates Moho surfaces based on a plurality of candidate values of Moho uplift at the rift center; for each of the plurality of candidate Moho surfaces, determining a candidate gravity response of the candidate Moho surface; determining a candidate residual gravity data associated with the candidate Moho surface; calculating a correlation between the gravity response of the candidate Moho surface and the candidate residual gravity data associated with the candidate Moho surface; and identifying a best candidate Moho surface among the plurality of candidate Moho surfaces based on the correlation coefficient.

A fifth aspect, combinable with the general implementation, wherein determining a value of a geometric parameter comprises determining the value of the geometric parameter in an iterative manner.

A sixth aspect, combinable with the general implementation, wherein the specified location of the rifted continental margin is a continental oceanic boundary or the rift center of the rifted continental margin.

A seventh aspect, combinable with the general implementation, wherein the depth to Moho surface, denoted as $h_m$, is determined according to:

$$h_m = h_c - h_R \left( \frac{4}{2 - \frac{px}{x_R} + 2e^{\frac{cx}{x_R}} - \frac{px}{x_R} e^{\frac{cx}{x_R}}} - 1 \right),$$

where $h_c$ is a base of the crust of the rifted continental margin, $h_R$ is the Moho uplift at the rift center, x is a horizontal distance relative to a baseline, $x_R$ is a distance from the baseline to the rift center, e is the natural logarithm, p is the geometric parameter, and c is a constant value defined as $$c = \ln\left(\frac{p}{2-p}\right).$$

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set

BRIEF DESCRIPTION OF THE DRAWINGS

Like reference numbers and designations in the various drawings indicate like elements.

DETAILED DESCRIPTION

Figure 1:
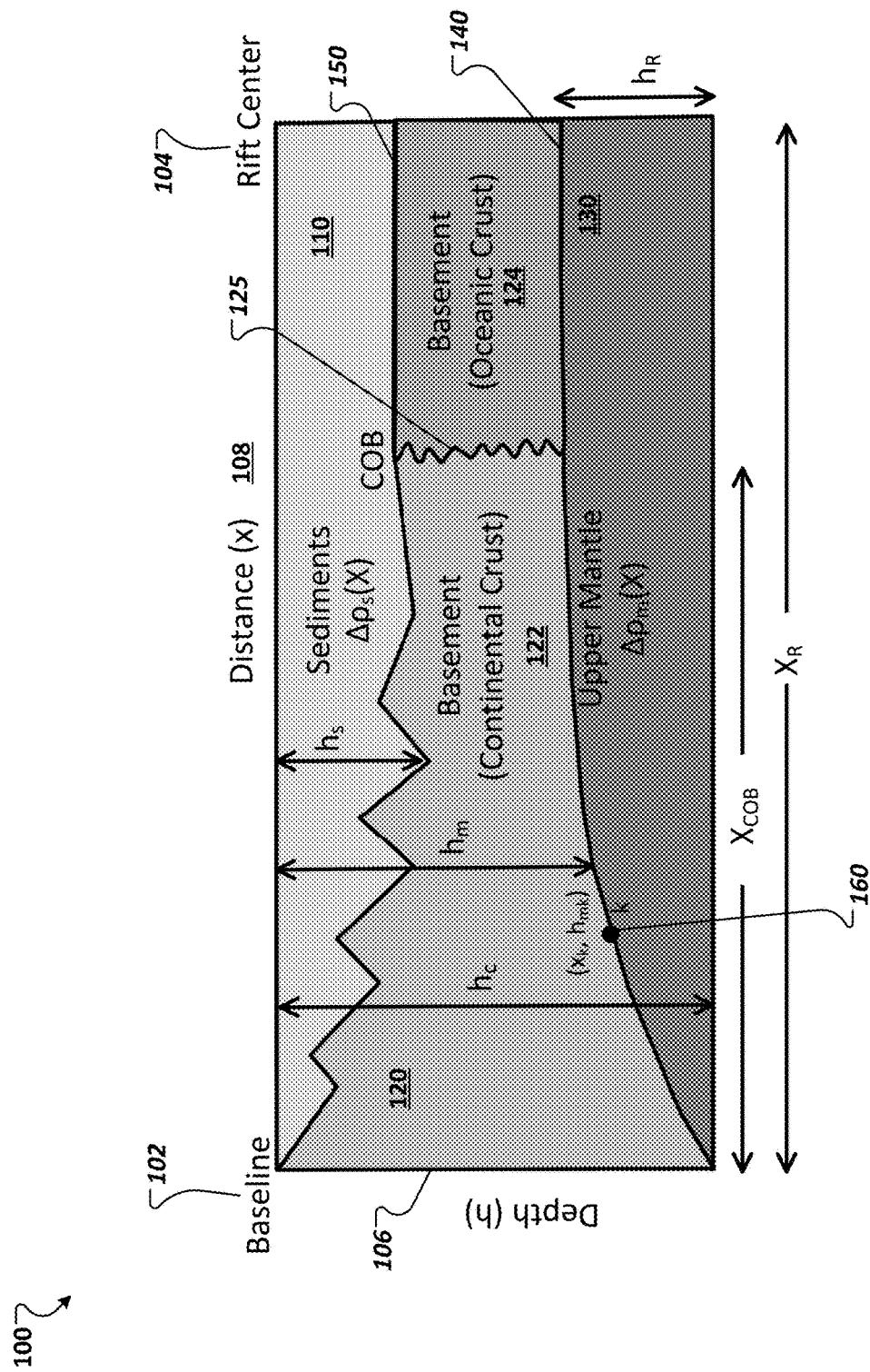
FIG. 1 illustrates an example rifted continental margin model, according to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure describes computer-implemented methods, software, and systems for gravity modeling a region of the Earth, such as a rifted continental margin, for example, for mapping morphologies of the top basement and top upper mantle Mohorovicic Discontinuity ("Moho") surfaces in the rifted continental margin.

Interpretation of gravity anomalies over rifted continental margins can be challenging because these anomalies are complicated in their shape and reduced in amplitude due to regional gravity anomalies associated with the positive density contrast at the Moho interface. In some implementations, the gravity data can be split into regional and residual fields using wavelength filtering or polynomial separation. However, splitting the data may not be perfect because some sedimentary basins produce gravity anomalies that have widths similar to that of the top upper mantle. In some implementations, the deep structures of rifted continental margins can be determined by estimating densities and vertical coordinates of polygonal bodies simultaneously. But the process involves a sophisticated non-linear inversion scheme where the initial model plays an important role in producing high resolution and accurate results. In some implementations, inverting for top basement and Moho surfaces together may be possible provided the two are strictly linked with an equation based on the Airy isostatic model. However, such a method uses local isostatic constraints to produce rough Moho surfaces that may not be geologically sound due to ductile properties of the rocks in the upper mantle.

The present example techniques can use observed gravity data (e.g., Bouguer gravity data) and available density information of a rifted continental margin to generate a crustal model of the rifted continental margin. The model of the rifted continental margin can include descriptions of the shapes of the Moho (e.g., the top upper mantle or the boundary/transition between the crust and the mantle) and top basement, for example, in a two-dimensional (2D) domain. New mathematical expressions are developed to simulate geometry of a smooth and uniform Moho surface. The geometry of the Moho surface can be constrained by an available known or predetermined value of the depth of the Moho surface or the depth to top basement (also referred to as a top basement depth control or a Moho depth control).

The geometry of the Moho surface can also be controlled using isostatic link assumption (where the Moho surface is generally anti-correlated with the basement surface) or where the Moho is un-correlated with the basement morphology. The Moho surface being anti-correlated (i.e., having a negative correlation) with the basement surface can include the cases, for example, if the depth to basement is deep, then the depth to Moho is shallow; and vice versa). In some implementations, after the geometry of the Moho surface is delineated or otherwise determined, a gravity response of the Moho surface is calculated and subtracted from the observed data to provide the associated residual gravity data. The residual gravity data can be used to derive the depth to top basement surface using conventional gravity inversion and modeling techniques for hydrocarbon exploration.

The present example techniques can achieve a number of advantages. For example, the example techniques can provide a more generalized model for modeling and inverting 2D gravity data for any rifted continental margins. The example techniques can provide a more accurate model that maps or otherwise represents the basement structures and Moho surface of the rifted continental margins. The example techniques can improve computationally efficiency for analyzing gravity data without mandating complicated non-linear inversion schemes. Moreover, in some implementations, the gravity data can be considered in a profile form. The work for one profile can be done using a standard desktop computer in a few minutes. The example techniques can provide efficiency and stability for estimating both basement and Moho structures. For example, simulations have shown that the effectiveness of the example techniques in modelling the basement and Moho structures of the Red Sea continental margin. The example techniques can be used for exploration and understanding of the crustal structure. The example techniques can be used in anti-correlation cases where the Moho generally mirrors surface topography, as well as cases where the Moho is un-correlated with the basement morphology. The example techniques can achieve additional or different advantages.

FIG. 1 is a plot showing an example model 100 of a rifted continental margin according to an implementation. FIG. 1 shows a baseline 102 and a rift center 104. The baseline 102 represents a reference point of the example model. Horizontal distances and depths are relative to this reference point. For example, the vertical axis 106 represents the depth relative to the depth of the baseline 102 and the horizontal axis 108 represents the horizontal distance x relative to the baseline 102. In FIG. 1, $x_R$ represents the distance from the baseline 102 to the rift center 104).

The example rifted continental margin model 100 includes sediments 110, basement 120, and mantle 130 in a region of the Earth. A top basement or basement surface 150 exists between the sediments 110 and the basement 120. A Moho surface 140 exists between the basement 120 and the mantle 130. The basement 120 can include a continental crust 122 and an oceanic crust 124. In some instances, the continental crust 122 can be stretched and gradually become thin from the Continental Oceanic Boundary (COB) 125 to the main rift center 104.

The sediments 110 have an effective sediment density contrast $\Delta\rho_s(x)$ at location x. The upper mantle 130 has an effective upper mantle density contrast $\Delta\rho_m(x)$ at location x. $h_m$ represents the depth to top upper mantle (Moho) 140. $h_s$ represents the depth to top basement 150. In the example model 100, $h_s$ could be either anti-correlated (isostatic) or un-correlated with the Moho surface 140.

In some implementations, Bouguer gravity anomaly can be used along a profile passing across a rifted continental margin. In some implementations, the Bouguer gravity anomaly ($g_{obs}$) over a rifted continental margin can be modeled as:

$$g_{obs} = g_s + g_m \quad (1)$$

where $g_s$ is the gravity effect due to a density contrast of the sediments 110, and $g_m$ is the gravity effect due to density contrast of the Moho surface 140. In some implementations, the depth to the Moho surface 140 ($h_m$) at a point x can be simulated using:

$$h_m = h_c - h_R \left( \frac{4}{2 - \frac{px}{x_R} + 2e^{\frac{cx}{x_R}} - \frac{px}{x_R}e^{\frac{cx}{x_R}}} - 1 \right), \quad (2)$$

where $h_c$ is the base of the crust, which can be defined using seismic refraction studies or other geophysical or geological information, $h_R$ is the Moho uplift at the rift center, x is the distance from the baseline, $x_R$ is the distance of the rift center from the baseline, e is the natural logarithm, p is a small positive value (0<p<1) that controls the geometry of the Moho surface—referred to as a geometric parameter of the Moho surface—and c is a constant value dependent on p and defined as:

$$c = \ln\left(\frac{p}{2-p}\right). \quad (3)$$

The last term in equation (2) is a logistic function and acts as a gain control of the Moho uplift. It can start with zero at the baseline 102 of the model 100 and increase to one at the location of the rift center 104.

In most rifted continental margins, the continental crust is gradually stretched and the thickness of the oceanic crust is nearly constant from the COB to the main rift center. This can be reflected in the shape of the Moho surface under stretched continental and oceanic crusts. In some implementations, the shape of the Moho surface under continental and oceanic crusts can be modeled using information about the location of the COB ($x_{COB}$). A proper value of geometric parameter p is selected to provide a desired value of the Moho uplift at the location of the COB, and hence constrains the geometry of the Moho. A desired value of the Moho uplift ($U_{COB}$) at the location $x_{COB}$ can be expressed as:

$$U_{COB} = \left( \frac{4}{2 - \frac{px_{COB}}{x_R} + 2e^{\frac{cx_{COB}}{x_R}} - \frac{px_{COB}}{x_R}e^{\frac{cx_{COB}}{x_R}}} - 1 \right). \quad (4)$$

Equation (4) is a nonlinear equation with one unknown parameter (p), which can typically be selected using a simple iterative approach to provide the desired value for the control of the Moho uplift at the location of COB. Note the example techniques described in this disclosure are not restricted to rifted continental margins that have already generated oceanic crust. The example techniques can be also applied to young rifted continental margins that have not yet generated oceanic crust, for example, by replacing the location of the COB (e.g., the COB 125 in FIG. 1) by the location of the main rift center (e.g., the rift center 104 in FIG. 1). Then the geometric parameter p can be selected to control the stretching geometry of the continental crust. For example, (p<0.001) can produce a curved thinning in the continental crust and (p>0.01) can produce a linear thinning in the continental crust.

Figure 2:
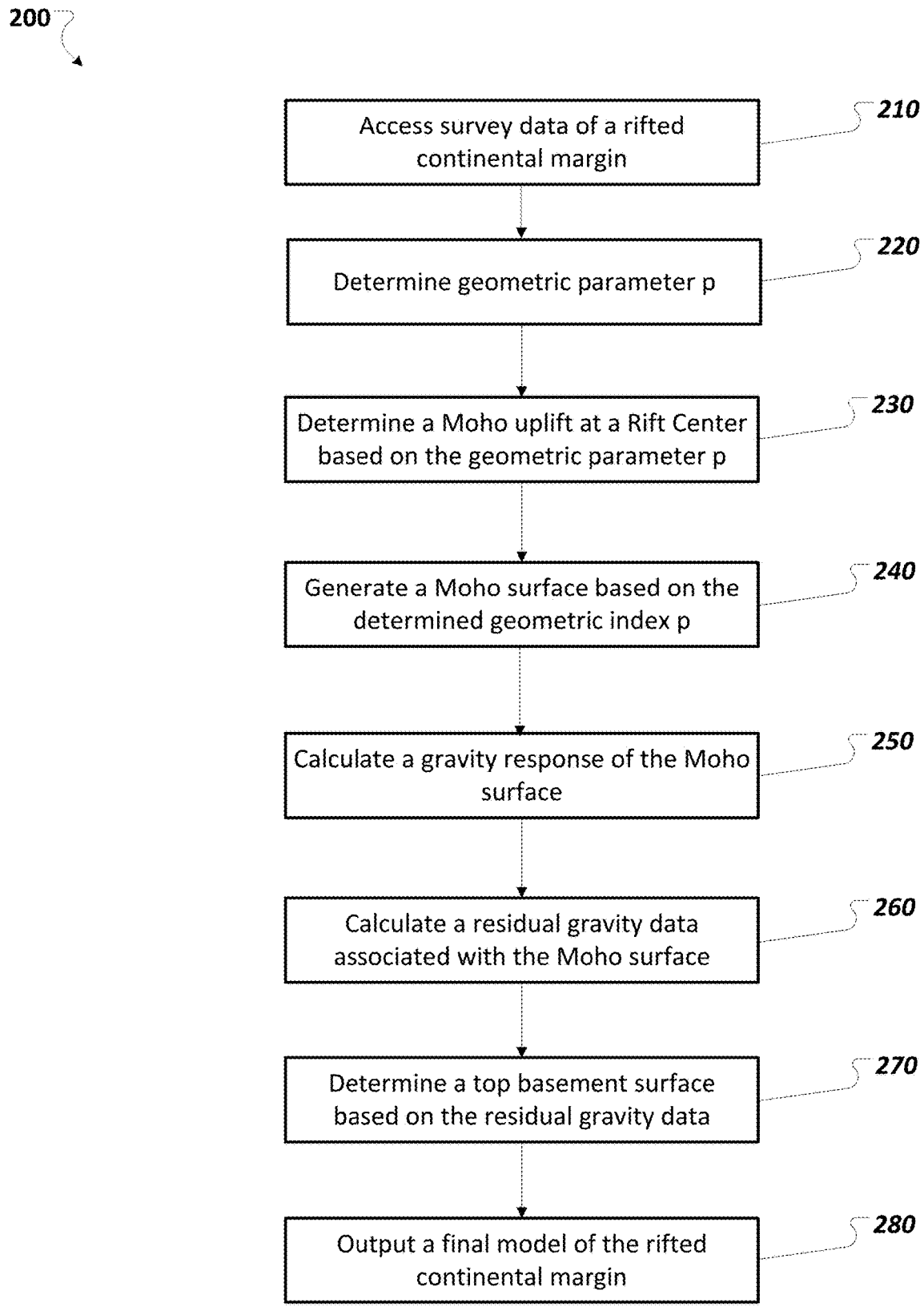
FIG. 2 is a flowchart showing an example process of gravity modelling a rifted continental margin, according to an implementation.

FIG. 2 is a flowchart showing an example process 200 of modelling rifted continental margin, according to an implementation. The process 200 can be implemented, for example, as computer instructions stored on computer-readable media and executable by data processing apparatus (e.g., the computer system 1200 illustrated in FIG. 12). In some implementations, some or all of the operations of process 200 can be distributed to be executed by a cluster of computing nodes, in sequence or in parallel, to improve efficiency. The example process 200, individual operations of the process 200, or groups of operations may be iterated or performed simultaneously (e.g., using multiple threads). In some cases, the example process 200 may include the same, additional, fewer, or different operations performed in the same or a different order.

At 210, survey data of a rifted continental margin is accessed, for example, by operation of a computer system.

The computer system can access the survey data, for example, by receiving the data from another device or system over a communication link or retrieving it from a data storage (e.g., a computer memory, hard disk, or other non-transitory computer-readable media). The survey data can include, for example, gravity data, density data, location data, or other data of the rifted continental margin.

Figure 6:
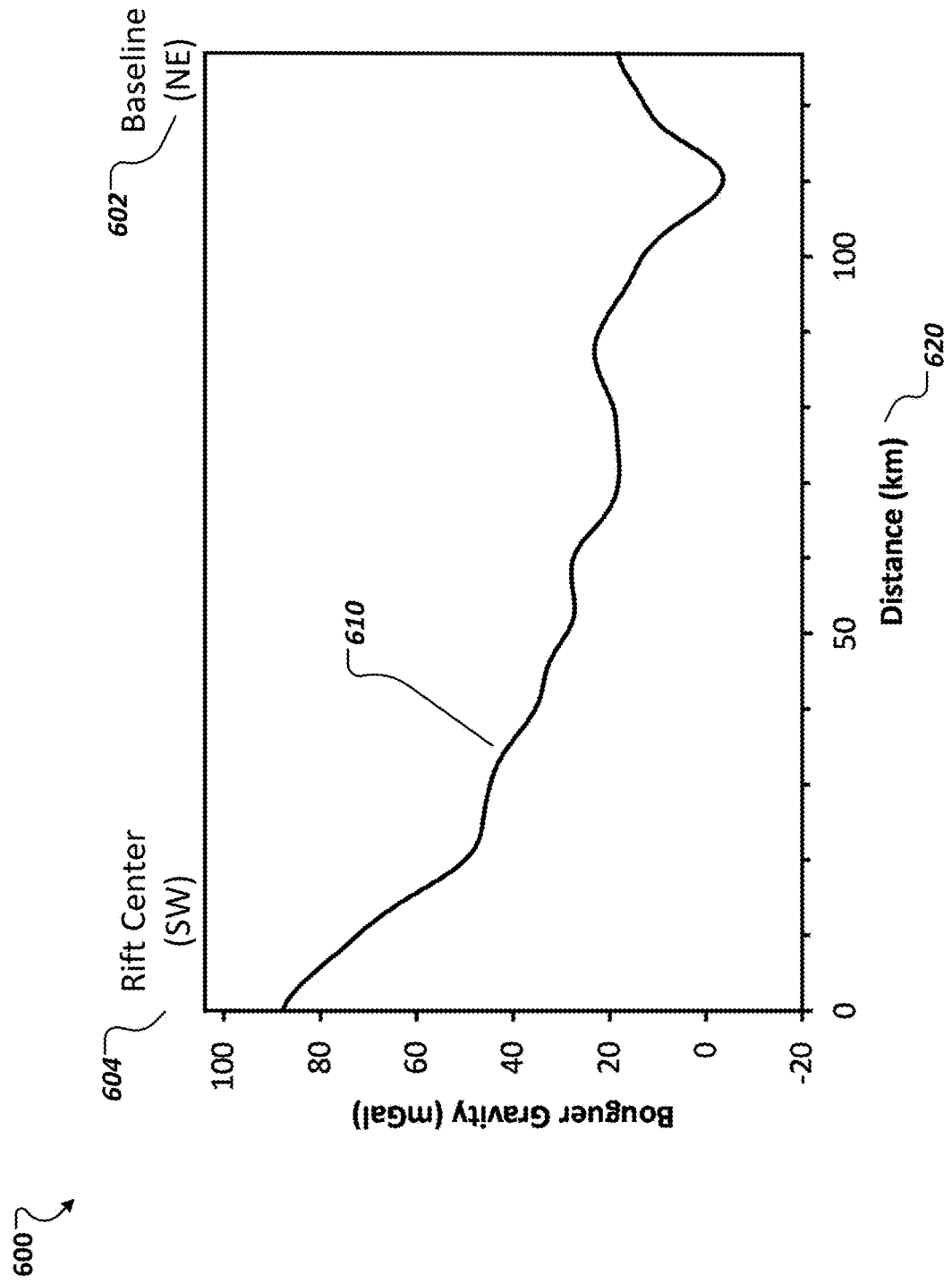
FIG. 6 is a plot showing example Bouguer gravity profile data measured above the eastern margin of the central Red Sea, according to an implementation.

The gravity data may be acquired using ground, marine, airborne, or satellite platforms for survey of the rifted continental margin. The gravity data (also referred to as observed gravity data ($g_{obs}$)) can include, for example, free-air corrected or Bouguer corrected gravity data in a profile passing across (e.g., perpendicular to) a rifted continental margin Profile is a line of gravity data passing across the margin. The profile data can include the gravity, density, and location data. The Bouguer gravity data is the data that has been corrected for the measurements elevation and mass distribution. Example Bouguer gravity profile data measured above the eastern margin of the central Red Sea is shown in FIG. 6.

The density information can be obtained, for example, based on petroleum well, seismic interpretation or other available information. The density data can include density information of the rifted continental margin. For example, the density data can include upper mantle density contrast data (e.g., effective upper mantle density contrast at x location ($\Delta\rho_m(x)$), sediment density contrast data (e.g., effective sediment density contrast at x location ($\Delta\rho_s(x)$), or other type of density data.

The location data can include information of the distance, elevation, or other geographic coordinates or attributes of points in the rifted continental margin. For example, the distance data can indicate the horizontal distance (x) of a data point with respect to the baseline (reference point). In some implementations, the location data can include the location (e.g., the depth, length, longitude, latitude, or other coordinates or attributes) of a COB, baseline, and rift center in the rifted continental margin. In some implementations, the location data can include the depth to Moho control or constraint (e.g., a known or predetermined value of the depth to Moho), the depth to top basement control or constraint (e.g., a known or predetermined value of the depth to top basement). The survey data can include additional or different information related to the rifted continental margin. From 210, the example process 200 proceeds to 220.

At 220, a value of a geometric parameter p is determined, for example, by operation of the computer system. In some implementations, the value of a geometric parameter p can be determined, for example, in an iterative manner, such that the control of the Moho uplift at the location of COB $U_{COB}$ achieves a desired value according to equation (4). The desired value can be an assumed value of how much the Moho is uplifted with respected to the uplift at the rift center. Generally, the oceanic crust is not stretched and nearly constant. So a value close to one would be good selection. For example, if one assumes it is 80 percent, the desired value should be 0.8. In another example, if the Moho uplift under oceanic crust is assumed to be 95% of the Moho uplift at the rift center, the value of $U_{COB}$ can be calculated iteratively using different values of p until $U_{COB}$ reaches 0.95 The value of p that corresponds to the desired value of $U_{COB}$ can be selected. From 220, the example process 200 proceeds to 230.

At 230, the Moho uplift at the rift center ($h_R$) can be estimated, selected, or otherwise determined, for example, by operation of the computer system. In some implementations, the value of the Moho uplift at the rift center ($h_R$) can be estimated in multiple different ways.

In some cases, the depth to Moho constraint is available, for example, based on seismic data, or based on a default value, specified by a user, or otherwise provided. In these cases, the depth to Moho constraint can be used to estimate the Moho uplift at the rift center ($h_R$). For example, the Moho uplift at the rift center ($h_R$) can be solved according to equation (2). For example, when information about the depth to Moho is available at a certain location k (e.g., from seismic studies), the Moho uplift left at the rift center ($h_R$) can be constrained such as:

$$h_R = (h_c - h_{mk}) / \left( \frac{4}{2 - \frac{px_k}{x_R} + 2e^{\frac{cx_k}{x_R}} - \frac{px_k}{x_R}e^{\frac{cx_k}{x_R}}} - 1 \right), \quad (5)$$

where $x_k$ is the distance of the location k (denoted as 160 in FIG. 1) from the baseline of the margin and $h_{mk}$ is the depth to Moho at the location k.

In some other cases, the depth to top basement constraints ($h_s^c$) are available. In these cases, a set of Moho surfaces can be generated using a set of tentative or candidate values of Moho uplift at the rift center ($h_R$). For each of these Moho surfaces, a gravity response ($g_m^{h_R}$) is calculated and subtracted from the observed gravity data ($g_{obs}$) to provide the associated residual gravity anomaly ($g_s^{h_R}$), which is used to derive unconstrained top basement, for example, using conventional gravity inversion techniques. Then the Moho uplift at the rift center ($h_R$) is selected based on the misfit between the estimate of depth to top basement and available depth to top basement controls. The Moho uplift at the rift center ($h_R$) that produces minimum misfit is selected.

For example, when information about the depth to Moho is not available, it is possible to use the depth-to-top basement controls to estimate the Moho uplift at the rift center ($h_R$) from a set of candidates. The estimation process can start with calculating theoretical gravity data for a set of tentative or candidate Moho surfaces with different values of Moho uplift at the rift center ($h_R$). For each Moho surface, a number of 2D prisms can be used. The 2D prisms are extending to infinity in the perpendicular direction to the rifted margin. Each prism is located directly below each gravity data point with a depth to bottom equal to the base of the crust ($h_C$) and depth to the top equal to the depth to Moho ($h_m$). Effective density contrast of the upper mantle ($\Delta\rho_m$) is assumed to be known and can be a constant or laterally varying due to, for example, a transition from continental to oceanic crusts. A conventional method of calculating the gravity effect of a 2D bodies of arbitrary shape can be used. For each data point, the theoretical gravity data ($g_m^{h_R}$) can be calculated by summation of the gravity effect from each 2D prism. Then the theoretical data is subtracted from the observed gravity data to provide the associated residual gravity data such as:

$$g_s^{h_R} = g_{obs} - g_m^{h_R}. \quad (6)$$

For each tentative or candidate Moho uplift at the rift center ($h_R$), the associated residual gravity data can be used to derive unconstrained top basement surface using one of classical gravity inversion methods. For example, in one classical gravity inversion method, each gravity value has a depth point in the model directly under it and the model is iterated until the gravity calculated from the whole model fits the data. For each $h_R$ candidate, a misfit is calculated between the estimate of depth to top basement ($h_s^{h_R}$) and available depth to top basement controls ($h_s^c$) such as:

$$\emptyset^{h_R} = \Sigma^N (h_s^{h_R} - h_s^c)^2, \quad (7)$$

where N is the number of depth to top basement controls. The Moho uplift at the rift center ($h_R$) that produces minimum misfit $\emptyset^{h_R}$ is selected.

In some other cases, regional isostatic constraints are applicable. For example, in most rifted continental margins, the top basement morphology is generally anti-correlated (negative correlation) with the Moho surface, a process called regional isostatic compensation where depth to Moho become shallow to compensate for deep depth to basement and vice versa. This regional isostatic hypothesis can be used to estimate the optimum Moho uplift at the rift center from a set of candidates. In these cases, a set of Moho surfaces can be generated using a set of tentative values of the Moho uplift at the rift center ($h_R$). For each of these Moho surfaces, a gravity response ($g_m^{h_R}$) is calculated and subtracted from the observed gravity data ($g_{obs}$) to provide the associated residual gravity anomaly ($g_s^{h_R}$). Then the Moho uplift at the rift center ($h_R$) can be selected based on a correlation between the gravity response of Moho surface ($g_m^{h_R}$) and the associated residual gravity data ($g_s^{h_R}$) in sequence. The Moho uplift at the rift center ($h_R$) associated with the pair of the gravity responses with the most negative correlation is selected assuming the basement is anti-correlated (negative correlation) with the Moho surface as in the regional isostatic case.

The estimation process can start with calculating theoretical gravity data for a set of tentative Moho surfaces with different values of Moho uplift the rift center ($h_R$) using the conventional algorithms of computing the gravity effect of 2D bodies of arbitrary shape. A number of 2D prisms that are extended to infinity in the direction perpendicular to the rifted margin can be used. Each prism is located directly below each gravity data point with a depth to bottom equal to the base of the crust ($h_C$) and depth to the top equal to the depth to Moho ($h_m$). Effective density contrast of the upper mantle ($\Delta \rho_m$) is assumed to be known and can be a constant or laterally varying due to transition from continental to oceanic crusts. This theoretical data is subtracted from the observed gravity data using equation (6) to provide the associated residual gravity data. Then for each tentative Moho uplift at the rift center ($h_R$), the associated residual gravity data ($g_s^{h_R}$) is correlated against the theoretical gravity data of the generated Moho surface ($g_m^{h_R}$) using a scaled correlation coefficient ($r_w^{h_R}$) defined as:

$$r_w^{h_R} = w^{h_R} \frac{\sum (g_m^{h_R} - \overline{g_m^{h_R}})(g_s^{h_R} - \overline{g_s^{h_R}})}{\sqrt{\sum (g_m^{h_R} - \overline{g_m^{h_R}})^2 \sum (g_s^{h_R} - \overline{g_s^{h_R}})}}, \quad (8)$$

where $\overline{g_m^{h_R}}$ and $\overline{g_s^{h_R}}$ are averaged values of the gravity response of the Moho surface and the associated residual gravity, respectively. Variable ($w^{h_R}$) is a scaling factor describing the relative weight for the Moho uplift at the rift center ($h_R$). The Moho uplift at the rift center ($h_R$) associated with the pair of the gravity responses with the most negative $r_w^{h_R}$ is selected assuming the basement is anti-correlated with the Moho surface as in the isostatic case. For the cases when basement is generally uncorrelated with the Moho surface, the Moho uplift at the rift center ($h_R$) associated with the pair of the gravity data set that produces the smallest $|r_w^{h_R}|$ is selected.

According to one or more of the example techniques described above, the Moho uplift at the rift center ($h_R$) can be determined. From 230, the example process 200 proceeds to 240.

At 240, the shape of the Moho surface can be generated by operation of the computer system based on the determined value of the geometric parameter p and the Moho uplift at the rift center ($h_R$). For example, the shape of the Moho surface can be generated based on the determined value of the geometric parameter p and the Moho uplift at the rift center ($h_R$) according to equations (2) and (5). From 240, the example process 200 proceeds to 250.

At 250, a gravity response of the Moho surface ($g_m^{h_R}$) is calculated, for example, by operation of the computer system. In some implementations, the gravity response of the Moho surface ($g_m^{h_R}$) can be calculated, for example, using the conventional algorithms of computing the gravity effect of 2D bodies of arbitrary shape. From 250, the example process 200 proceeds to 260.

At 260, a residual gravity response ($g_s^{h_R}$) associated with the Moho surface is calculated, for example, by operation of the computer system. In some implementations, the residual gravity response of the Moho surface can be calculated, for example, by subtracting the gravity response of the Moho surface ($g_m^{h_R}$) calculated at 250 from the observed gravity data ($g_{obs}$) according to equation (6). From 260, the example process 200 proceeds to 270.

At 270, a top basement surface is determined based on the residual gravity data by operation of the computer system. In some implementations, the top basement surface can be an unconstrained depth to top basement determined using classical gravity inversion techniques, for example, in which, each gravity value has a depth point in the model directly under it and the model is iterated until the gravity calculated from the whole model fits the data. In some implementations, a number of 2D prisms is used. Each prism is located directly below each observed gravity data point and continues horizontally to infinity with a bottom depth simulating the depth to top basement. Density contrast of the sediments ($\Delta \rho_s$) is assumed to be known and can be a constant or laterally varying based on available density information. A conventional algorithm of computing the gravity effect of 2D bodies of arbitrary shape is used to calculate the gravity response of the top basement model. In the inversion process, the depth to top basement surface (i.e., bottom of the prism) at each residual gravity data point is iterated independently until the gravity calculated from the whole basement model fits the residual gravity data.

In unconstrained inversion of the residual gravity data, the depth to the top basement model is iterated to a model that fits the residual gravity data. In some implementations, the updated model does not necessarily match real depth to top basement. Deviation of the depth estimate from real depths are due to the existence of additional regional gravity effects that may not be included in the gravity effect of the top upper mantle and/or inaccuracies in the used effective density contrasts. The regional effects and inaccurate density contrasts may produce gravity component that could be removed to obtain precise depth to top basement from inversion of the residual gravity data.

In some implementations, another process of data adjustment can be applied after the process of unconstrained inversion based on the controls of depth to top basement that are used to approximate the undesirable gravity component.

For example, for each control of depth to top basement, a gravity difference is computed due to the difference in the estimate of the depth to top basement and the control depth using the slab formula. These differences are interpolated to provide the gravity differences across the profile. The interpolated gravity differences are then subtracted from the residual gravity data to provide adjusted residual gravity data, which can be used again in the inversion process. The dual iteration can be repeated until a crustal model of the rifted continental margin is obtained that fits the gravity data and matches the known depth to top basement. From 270, the example process 200 proceeds to 280.

At 280, a crustal model of the rifted continental margin is output by operation of the computer system. The crustal model can include information (e.g., depth or other attributes) of the determined Moho surface and top basement surface of the rifted continental margin. Outputting the crustal model can include, for example, saving the crustal model in a database or data storage, presenting the crustal model to a user via a graphical user interface (e.g., such as illustrated in FIGS. 6-10a and 10b), or transmitting or otherwise providing it to other applications or computing devices over a communication link. The crustal models can be used for crustal study, subsalt or hydrocarbon exploration, or other applications. After 280, the example process 200 terminates.

In the following, FIGS. 3-5 show example processes 300, 400, and 500 for modelling rifted continental margins. In the example process 300, the shape of the Moho surface is constrained with a known or predetermined depth to Moho. In the example process 400, the shape of the Moho surface can be determined using known values of depth to top basement constraints. In the example process 500, the shape of the Moho surface is delineated assuming regional isostatic constraints. The processes 300, 400, and 500 can be example implementations of the example process 200 in FIG. 2. In FIGS. 3-5, the blocks with rounded corners (e.g., blocks 315, 415, and 515) are associated with input, while the blocks with dashed boundaries (e.g., blocks 322, 452, and 552) are associated with output.

Figure 12:
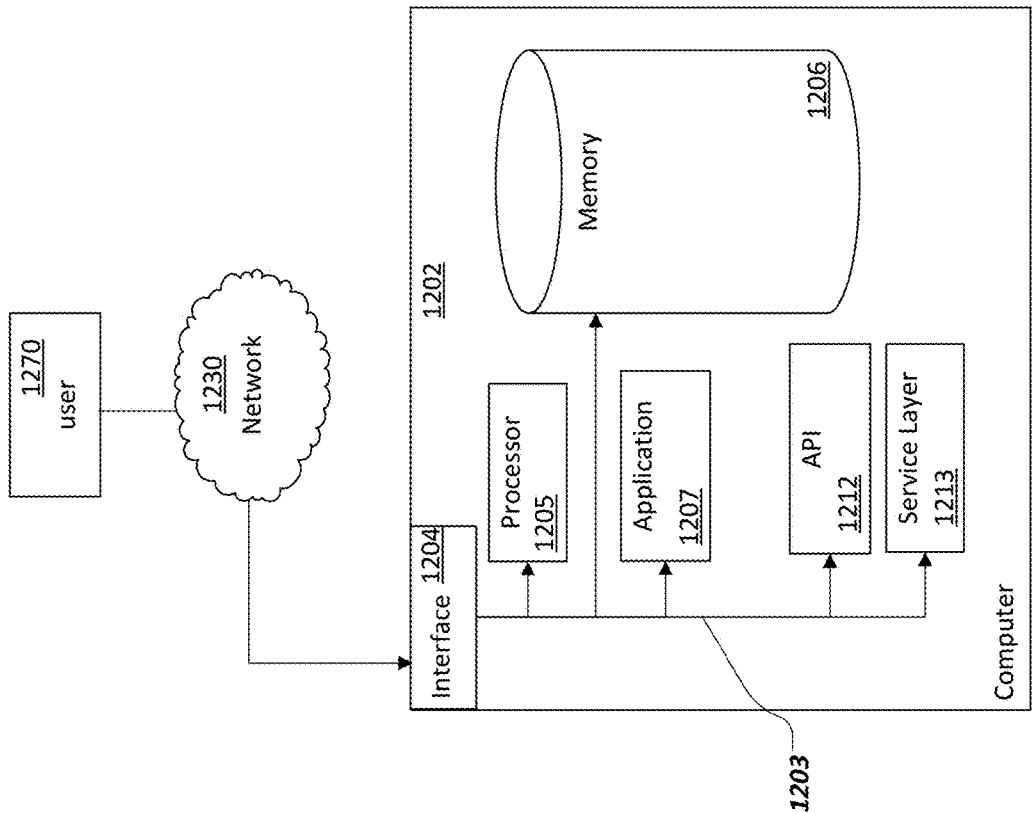
FIG. 12 is a diagram showing an example computer system for gravity modelling a rifted continental margin, according to an implementation.

The processes 300, 400, and 500 can be implemented, for example, as computer instructions stored on computer-readable media and executable by data processing apparatus (for example, the computer system 1200 in FIG. 12). The example processes 300, 400, and 500, individual operations of the processes 300, 400, and 500, or groups of operations may be iterated or performed simultaneously (for example, using multiple threads). In some cases, the example processes 300, 400, and 500 may include the same, additional, fewer, or different operations performed in the same or a different order.

Figure 3A:
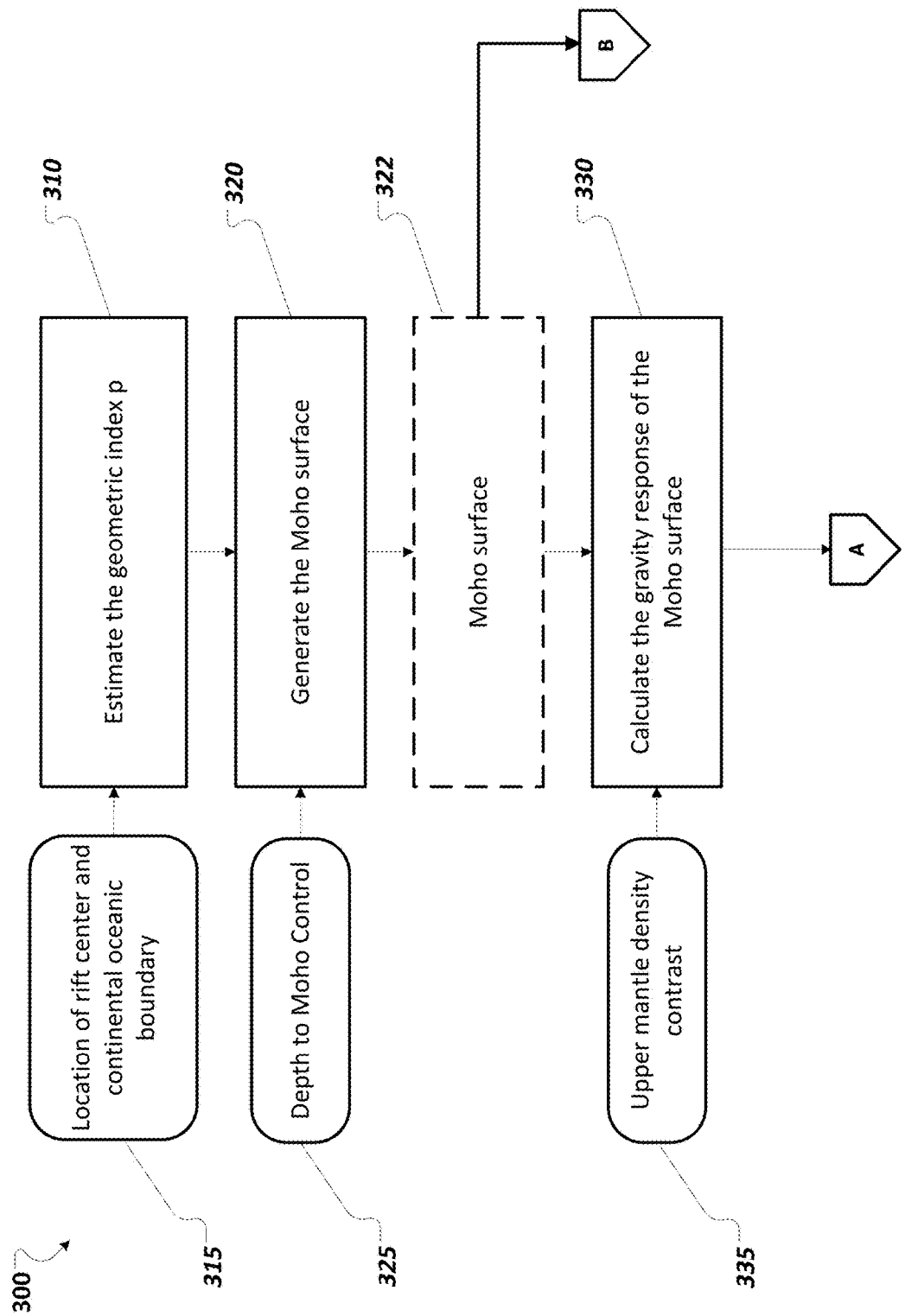
FIGS. 3A & 3B together (collectively FIG. 3) illustrate a flowchart showing an example process of gravity modelling a rifted continental margin with a Mohorovicic Discontinuity (Moho) surface constrained using controls of depth to Moho, according to an implementation.
Figure 3B:
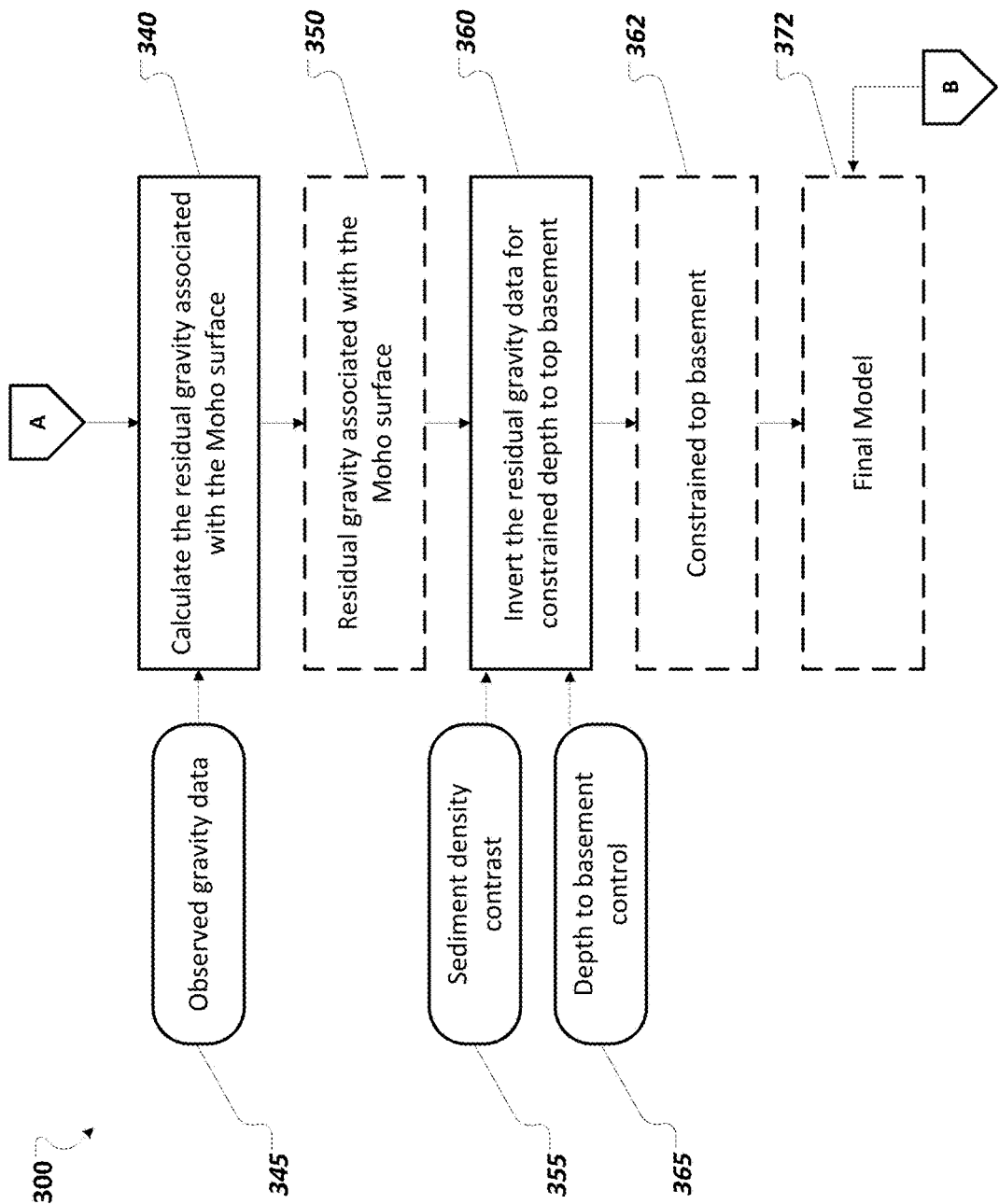

FIGS. 3A & 3B together illustrate a flowchart showing an example process 300 of gravity modelling a rifted continental margin with a Moho surface constrained with controls of depth to Moho, according to an implementation. In some implementations, at 310, the geometric parameter or index p is estimated using equation (4) based on the location of the rift center and continental oceanic boundary ($x_{COB}$) 315 and a desired value for the Moho uplift at the COB. In this case, the depth to Moho control 325 is available. At 320, the Moho surface can be generated based on the depth to Moho control 325 and the geometric parameter p according to equations (5) and (2). At 322, the Moho surface can be obtained and output. At 330, the gravity response of the Moho surface can be calculated based on the upper mantle density contrast data 335, for example, using the conventional algorithms of computing the gravity effect of 2D bodies of arbitrary shape.

Turning now to FIG. 3B, at 340, the residual gravity associated with the Moho surface can be calculated based on the observed gravity data 345, for example, according to equation (6). At 350, the residual gravity associated with the Moho surface can be obtained and output. At 360, the residual gravity data can be inverted based on the sediment density contrast 355 and the depth to basement control 365, for example, according to a constrained inversion method, in which, each gravity value has a depth point in the model directly under it and the model is iterated until the gravity calculated from the whole model fits the data and the estimated depth to basement matches the depth to basement controls 365. As a result, a constrained top basement surface can be obtained and output at 362. At 372, a final crustal model that includes the Moho surface 322 and the constrained top basement surface can be obtained and output, for example, according to the example techniques described with respect to 280 of the example process 200. From 372, process 300 stops.

Figure 4A:
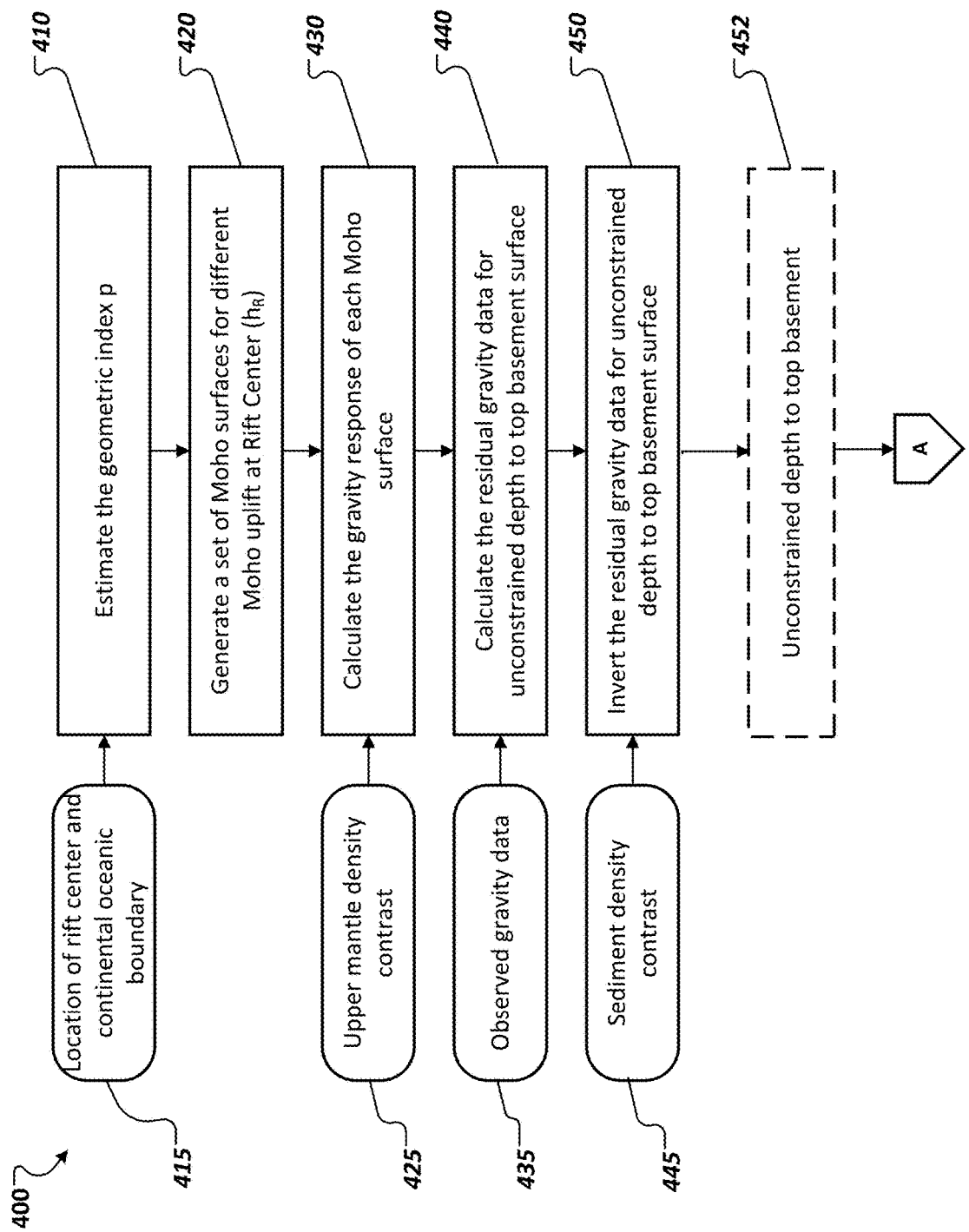
FIGS. 4A & 4B together (collectively FIG. 4) illustrate a flowchart showing an example process of gravity modelling a rifted continental margin constrained with a Moho surface constrained using controls of depth to the top basement, according to an implementation.
Figure 4B:
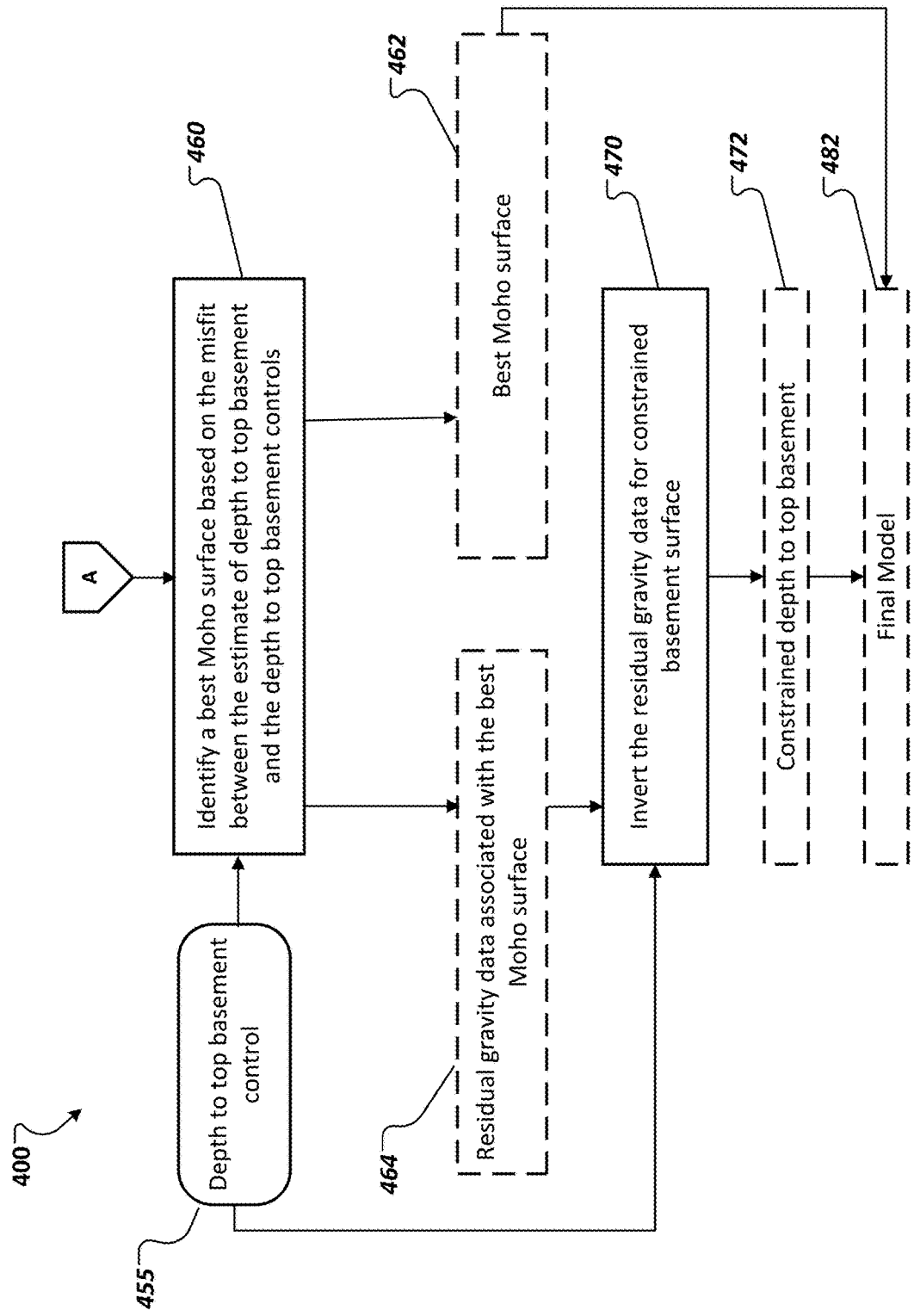

FIGS. 4A & 4B together illustrate a flowchart showing an example process 400 of gravity modelling a rifted continental margin with a Moho surface constrained with controls of depth to top basement, according to an implementation. In some implementations, at 410, the geometric parameter or index p is estimated using equation (4) based on the location of the rift center and continental oceanic boundary ($x_{COB}$) 415 and a desired value for the Moho uplift at the COB. At 420, a set of Moho surfaces for different values of Moho uplift at the rift center can be generated based on the geometric parameter p according to equation (2). At 430, for each of the set of Moho surfaces, a gravity response of the Moho surface can be calculated based on the upper mantle density contrast data 425, for example, using the conventional algorithm of computing the gravity effect of 2D bodies of arbitrary shape. At 440, for each of the set of Moho surfaces, the residual gravity associated with the Moho surface can be calculated based on the observed gravity data 435, for example, according to equation (6). At 450, the residual gravity data associated with each of the Moho surfaces can be inverted based on the sediment density contrast 445 to obtain an unconstrained depth to top basement surface, for example, according to a conventional gravity inversion method, in which, each gravity value has a depth point in the model directly under it and the top basement model is iterated until the gravity calculated from the whole model fits the data. As a result, a set of unconstrained top basement surfaces can be obtained and output at 452.

Turning now to FIG. 4B, at 460, a best Moho surface can be identified based on the misfit between the estimate of depth to top basement and the depth to top basement control 455 according to equation (7). As a result, the best Moho surface and the residual gravity associated with the best Moho surface can be obtained and output at 462 and 464. At 470, the residual gravity associated with the best Moho surface can be inverted based on the depth to top basement control 455 to construct a constrained basement surface, for example, according to a constrained gravity inversion method, in which, each gravity value has a depth point in the model directly under it and the top basement model is iterated until the gravity calculated from the whole model fits the data and the estimate of depth to top basement matches the depth to top basement controls 455 At 472, the constrained top basement surface can be obtained and output. At 482, a final crustal model that includes the best Moho surface 462 and the constrained top basement surface 472 can be obtained and output, for example, according to the example techniques described with respect to 280 of the example process 200. From 482, process 400 stops.

Figure 5A:
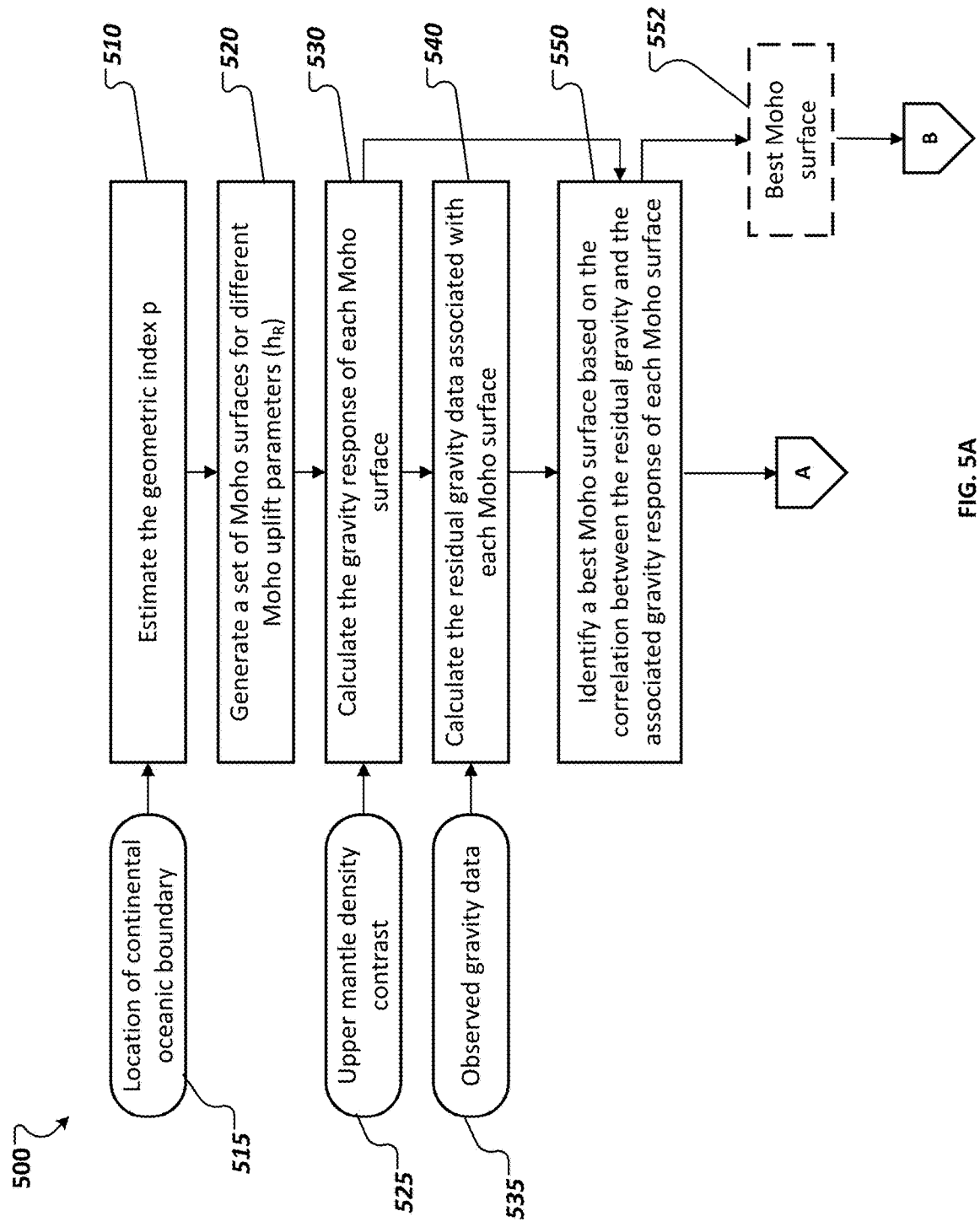
FIGS. 5A & 5B together (collectively FIG. 5) illustrate a flowchart showing an example process of gravity modelling a rifted continental margin with a Moho surface constrained with regional isostatic control, according to an implementation.
Figure 5B:
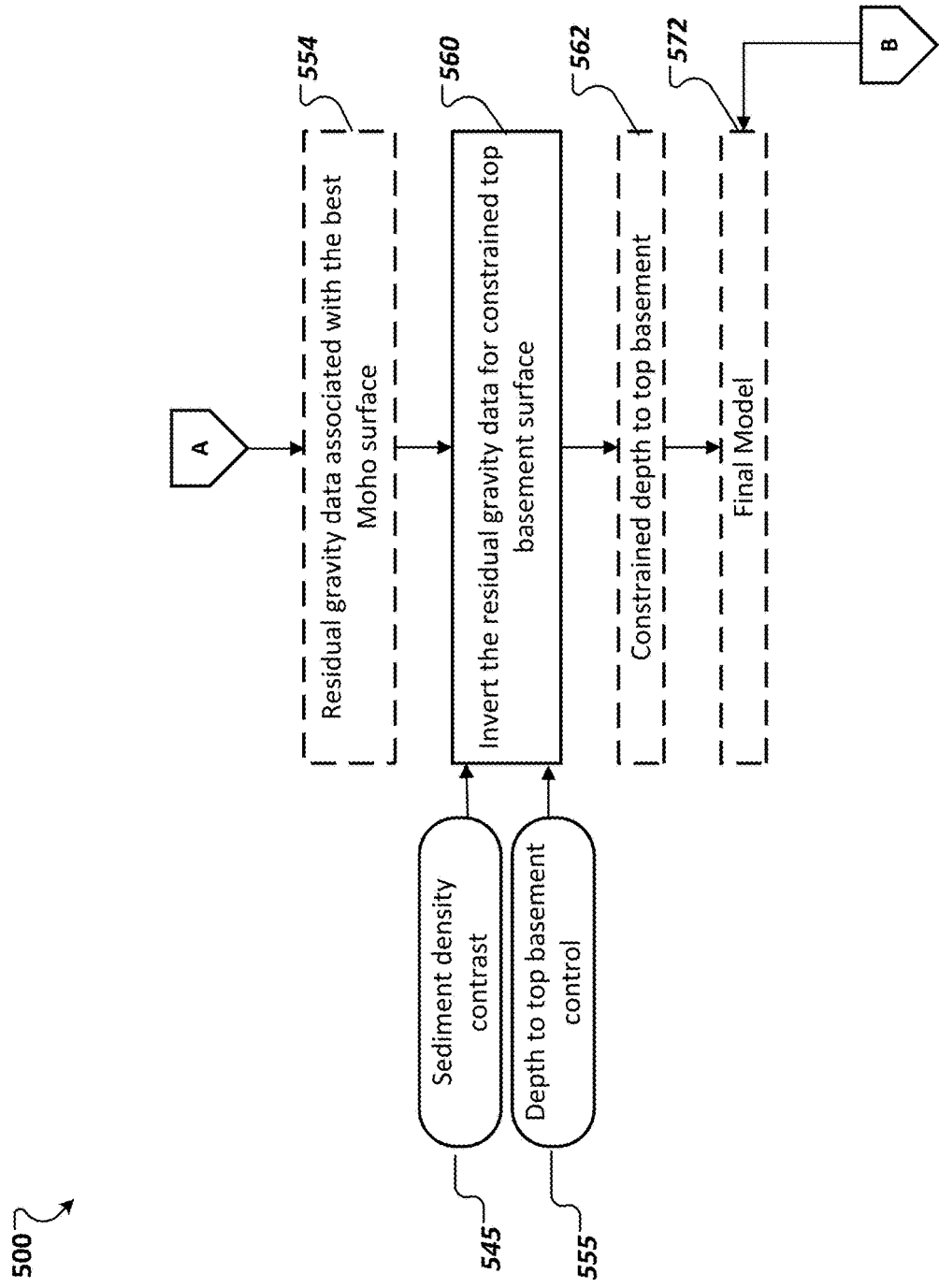

FIGS. 5A & 5B together illustrate a flowchart showing an example process 500 of gravity modelling a rifted continental margin with a Moho surface constrained with regional isostatic control, according to an implementation. In some implementations, at 510, the geometric parameter or index p is estimated using equation (4) based on the location of continental oceanic boundary ($x_{COB}$) 515. At 520, a set of Moho surfaces for different values of Moho uplift at the rift center can be generated based on the geometric parameter p according to equation (2). At 530, for each of the set of Moho surfaces, a gravity response of the Moho surface can be calculated based on the upper mantle density contrast data 525, for example, using conventional algorithm of computing the gravity effect of 2D bodies of arbitrary shape. At 540, for each of the set of Moho surfaces, the residual gravity associated with the Moho surface can be calculated based on the observed gravity data 535, for example, according to equation (6). At 550, a best Moho surface can be identified based on a correlation between the residual gravity and the associated gravity response of each Moho surface according to example techniques described with respect to equation (8). In some implementations, the best Moho surface can be the Moho surface that corresponds to the pair of the gravity data set that produces the smallest absolute value of the correlation. As a result, the best Moho surface and the residual gravity associated with the best Moho surface can be obtained and output at 552 and (turning now to FIG. 5B) 554. At 560, the residual gravity associated with the best Moho surface can be inverted based on the sediment density contrast 545 and the depth to top basement control 555, for example, according to a constrained gravity inversion method, in which, each gravity value has a depth point in the model directly under it and the top basement model is iterated until the gravity calculated from the whole model fits the data and the estimate of the depth to top basement matches the depth to basement controls 555. At 562, a constrained top basement surface can be obtained and output. At 572, a final crustal model that includes the best Moho surface 552 (from FIG. 5A) and the constrained top basement surface 562 can be obtained and output, for example, according to the example techniques described with respect to 280 of the example process 200. From 572, process 500 stops.

FIG. 6 is a plot 600 showing example Bouguer gravity profile data 610 measured above the eastern margin of the central Red Sea, according to an implementation. The gravity data 610 is plotted against the distances 620 of data points that were sampled at an interval of 500 m across a 127 km profile from the rift center 604 in the southwest to the baseline 602 in the northeast. In the central Red Sea rift, oceanic crust has been generated and extends to about 30 km in both sides of the rift center 604. In this example, horizontal distances of the gravity data, COB, rift center were recalculated to be relative to the baseline 602. In this example, the base of the crust $h_c$ was assigned a value of 20 km based on seismic refraction studies. The Moho uplift control was considered to be reduced slowly from 1 at the rift center to a desired value of 0.95 at the COB.

Figure 7:
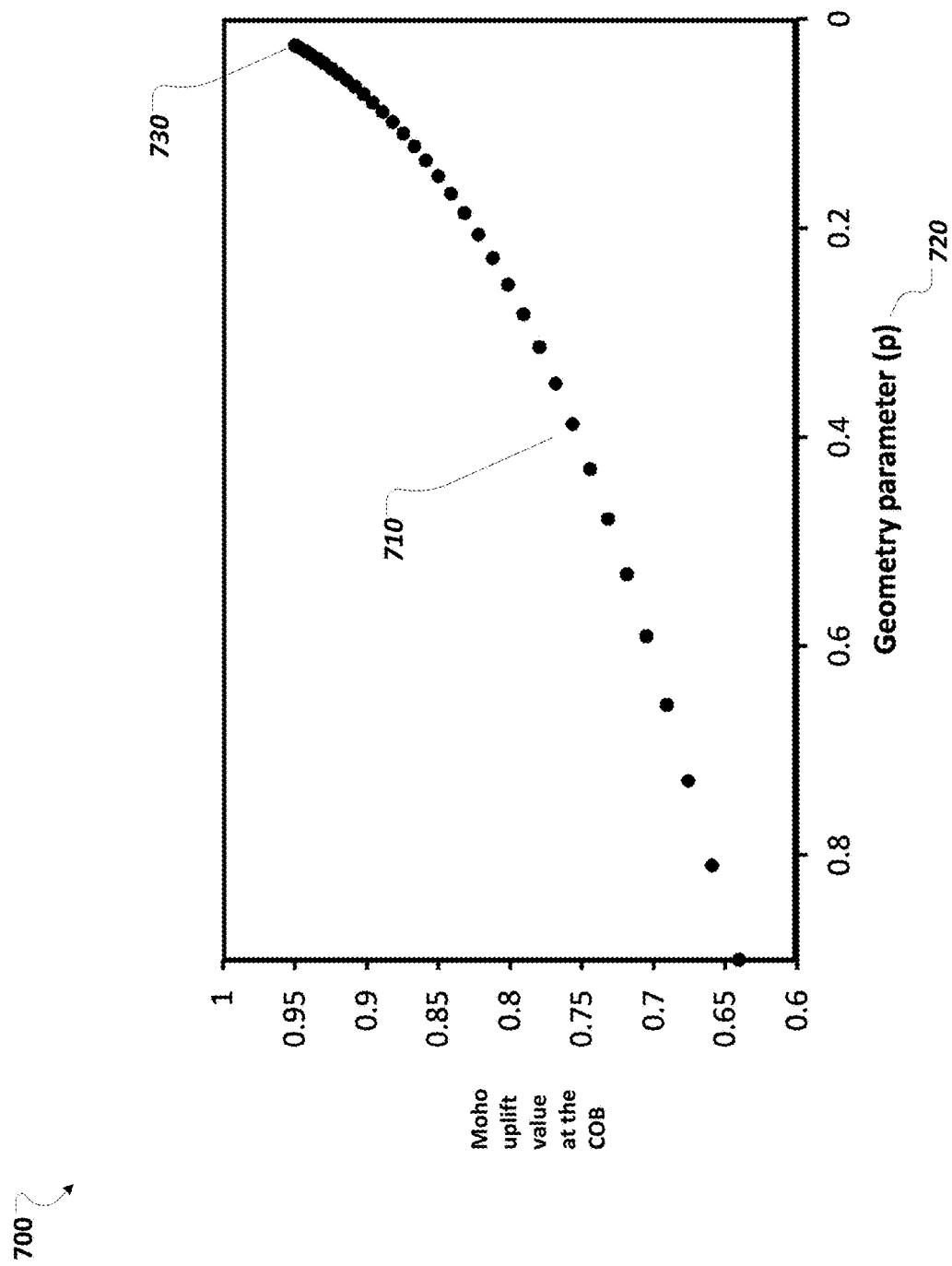
FIG. 7 is a plot showing example Moho uplift control at the Continental Oceanic Boundary (COB) with different geometric parameter values for the eastern margin of the central Red Sea, according to an implementation

FIG. 7 is a plot 700 showing example Moho uplift value at the COB ($U_{COB}$) 710 with different values of geometric parameter (p) 720 for the eastern margin of the central Red Sea, according to an implementation. The values of the Moho uplift at the COB ($U_{COB}$) 710 was determined in an interactive manner using different values of geometric parameter p 720 according to the example techniques described with respect to above-described operation 220 and equation (4). In this example, the value of geometric parameter p starts with 0.9 and is reduced by 1% in each step until the Moho uplift control ($U_{COB}$) reaches 0.95 using p=0.025 at 730. In this case, p=0.025 can be the value selected as a result of the operation 220 in the example process 200.

In this example, regional isostatic constraints were considered. The geometric parameter p was used in equation (2) to produce a set of Moho surfaces for different Moho uplift values at the rift center ($h_R$) starting from 1 km to 15 km with a step of 0.5 km. For each Moho surface, gravity data was calculated. An effective density contrast of 400 kg/m$^3$ was assigned to the upper mantle under the oceanic crust and started to increase gradually to 500 kg/m$^3$ under the continental crust. Residual gravity data was calculated for each tentative Moho uplift at the rift center ($h_R$) and for each pair of the gravity data, a correlation coefficient was computed and scaled by the value of the Moho uplift at the rift center ($w^{h_R}=1/h_R$). In this example, anti-correlation assumption (regional isostatic) was considered.

Figure 8:
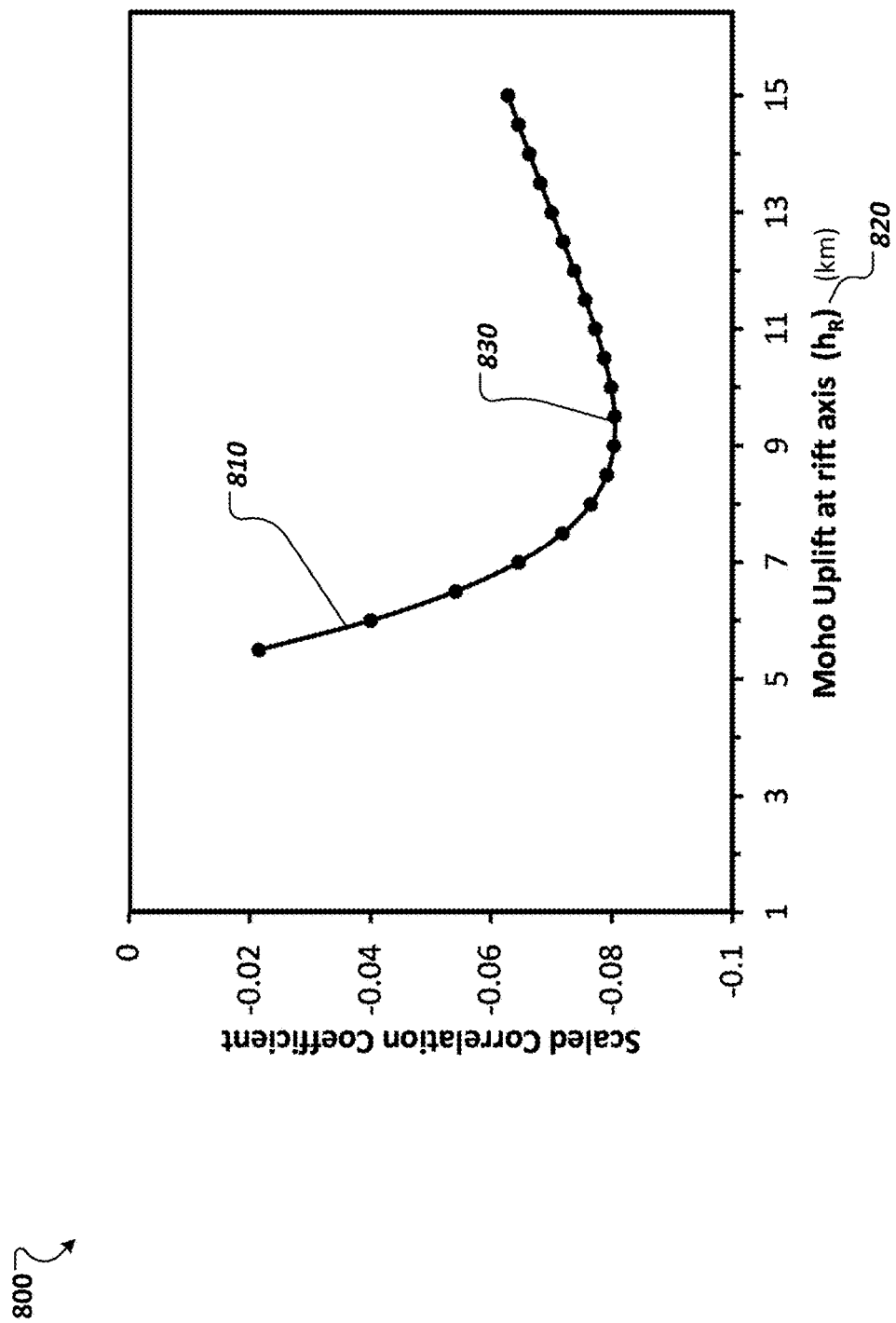
FIG. 8 is a plot showing example scaled correlation coefficients between the gravity response of different Moho surfaces generated by different values of Moho uplift at rift center and associated residual gravity data, according to an implementation.

FIG. 8 is a plot 800 showing example scaled correlation coefficients 810 between gravity response of different Moho surfaces generated by different values of Moho uplift at rift center ($h_R$) 820 and associated residual gravity data, according to an implementation. The scaled correlation coefficients 810 are negative scaled correlation coefficients that were obtained with Moho uplift at the rift center greater than 5.5 km. The most negative coefficient was obtained using Moho uplift at the rift center of 9.5 km as shown at 830, which provides a depth to Moho of 10.5 km at the rift center.

Figure 9:
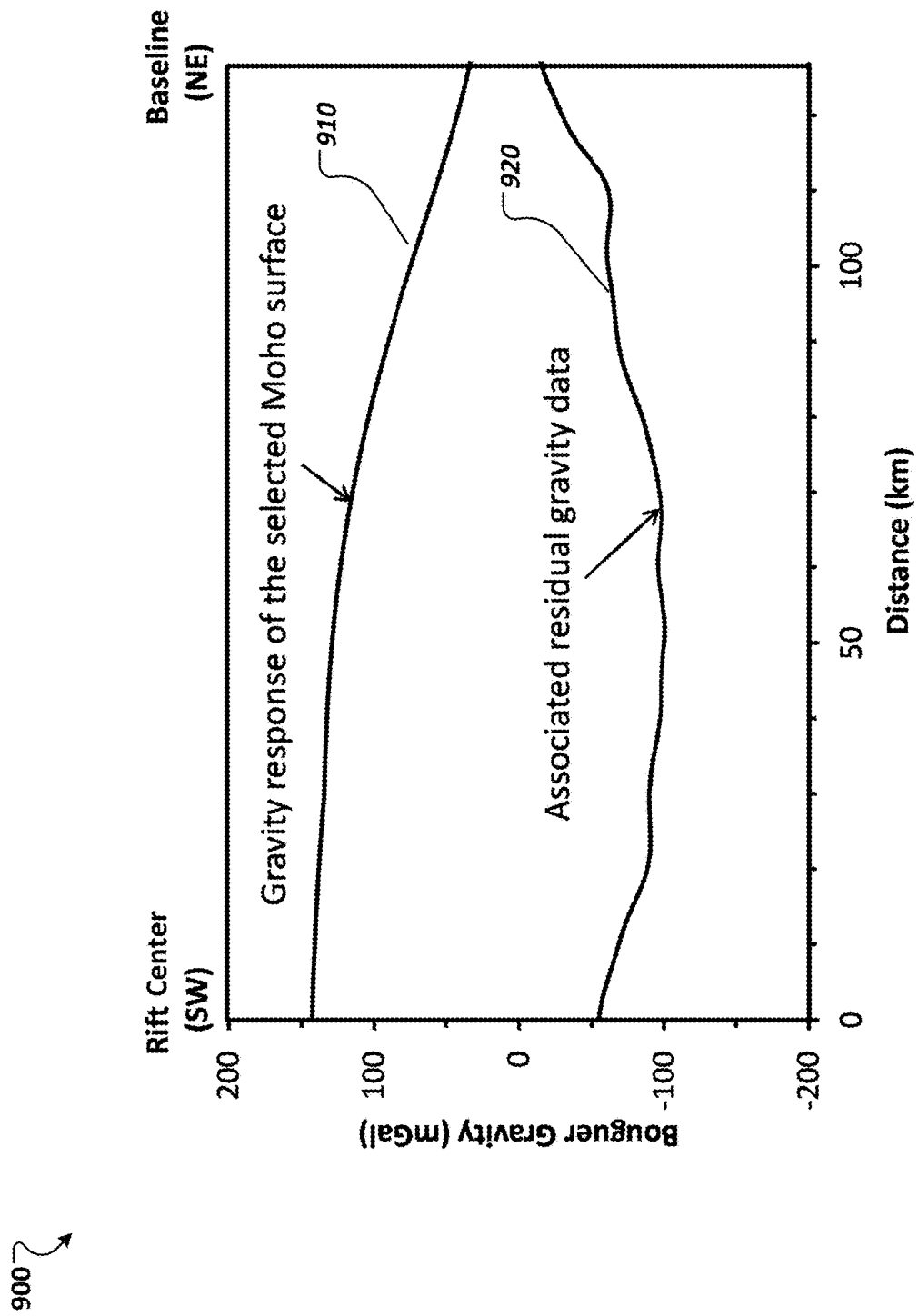
FIG. 9 is a plot showing example gravity data due to selected Moho surface and associated residual gravity, according to an implementation.

FIG. 9 is a plot 900 showing example gravity data 910 due to the selected Moho surface and the associated residual gravity 920, according to an implementation. The gravity data 910 is due to upper mantle density contrasts and the associated residual gravity data 920 is due to sediment density contrasts for the selected geometry of the Moho surface. The residual gravity data 920 was used to derive the top basement using an inversion approach with an effective sediment density contrast of −450 kg/m$^3$. Depth to top basement controls were not available, inversion was constrained using basement outcrop at the baseline and an arbitrary assumption of maximum sediment thickness of 3 km (including water depth) at the rift center.

Figure 10:
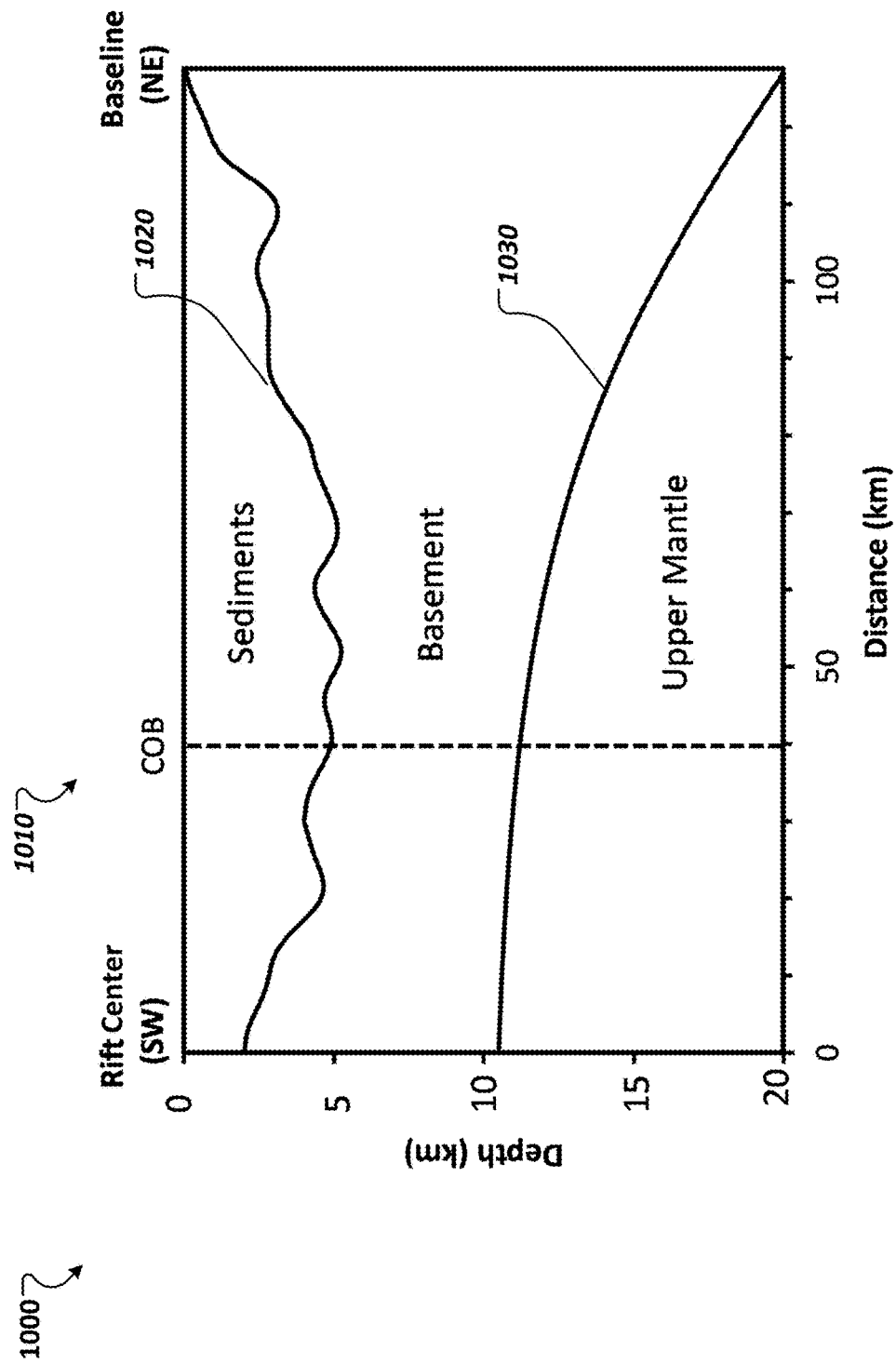
FIG. 10 is a plot showing an example crustal model for the eastern margin in the central Red Sea, according to an implementation.

FIG. 10 is a plot 1000 showing an example crustal model 1010 constructed for the eastern margin in the central Red Sea, according to an implementation. The crustal model 1010 was constructed according to the example techniques described above (e.g., the example processes 200 and 500 described with respect to FIGS. 2 and 5). The crustal model 1000 includes the obtained top basement surface 1020 and Moho surface 1030.

Figure 11:
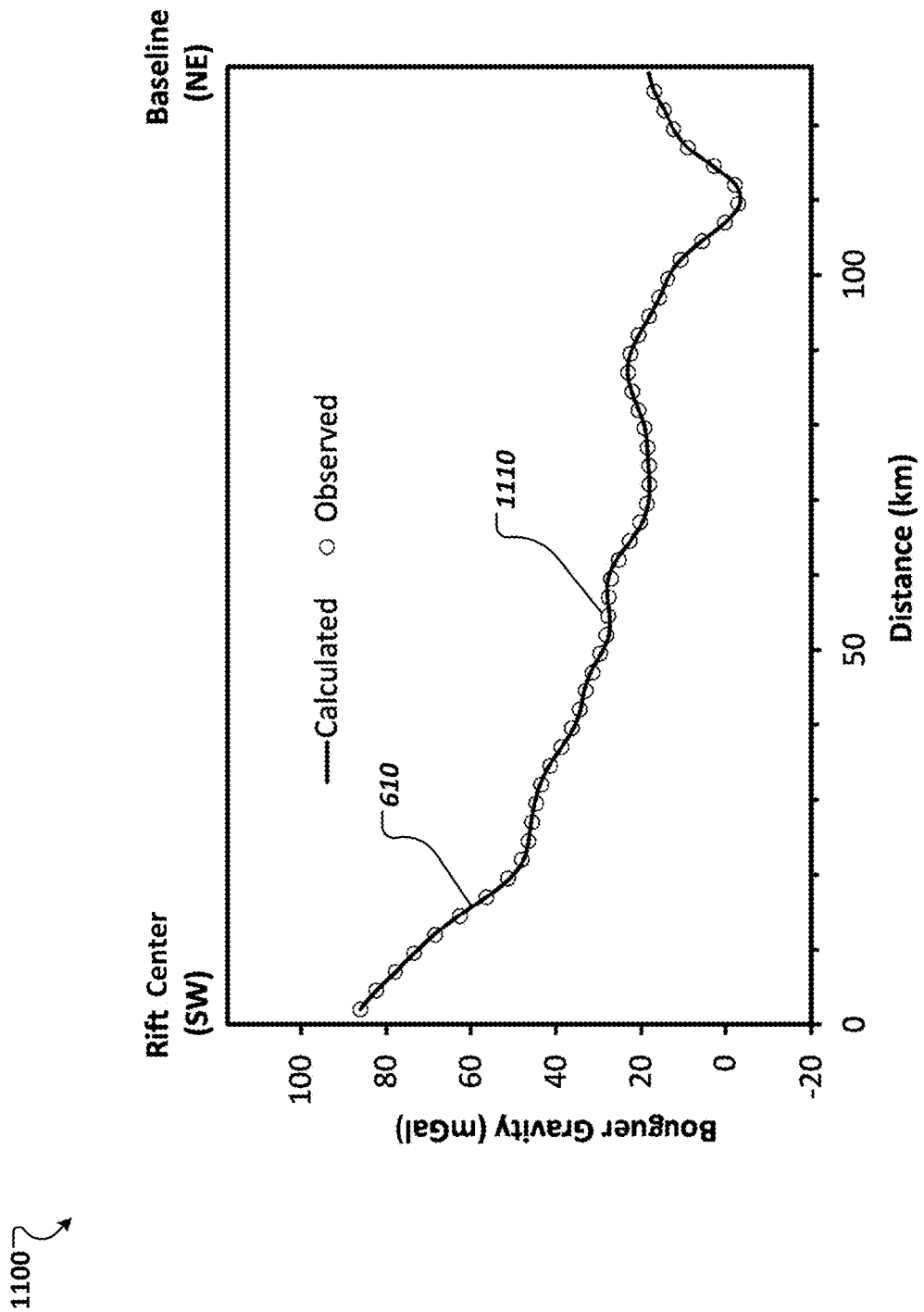
FIG. 11 is a plot showing the fit between a calculated gravity response of the crustal model of FIG. 10 and the observed Bouguer gravity data of FIG. 6, according to an implementation.

FIG. 11 is a plot 1100 showing the fit between the calculated gravity response 1010 of the example crustal model 1010 as shown in FIG. 10 and the observed Bouguer gravity data 610 as shown in FIG. 6, according to an implementation. The plot 1100 shows that the calculated gravity response 1010 of the example crustal model 1010, as shown in FIG. 10, agrees well with the observed Bouguer gravity data 610 as shown in FIG. 6, demonstrating the accuracy of the crustal model 1010 obtained according to the example techniques described in this disclosure.

FIG. 12 is a high-level architecture block diagram of a gravity modeling system 1200 according to an implementation. At a high level, the illustrated system 1200 includes a user 1270 that is communicably coupled with a gravity modeling computer 1202 through a network 1230. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The user 1270 represents a person, an application, set of applications, software, software modules, hardware, or combination thereof that can perform and prepare gravity, location, and constraints data. For example, the user 1270 can be a geophysicist in a company that is responsible for gravity modeling.

The network 1230 facilitates communications between the components of the system 1200 (e.g., between the user 1270 and the gravity modeling computer 1202). In some cases, the user 1270 can access the gravity modeling computer 1202 from a remote network. In these or other cases, the network 1230 can be a wireless or a wireline network. In some cases, the user 1270 can access the gravity modeling computer 1202 locally. In these or other cases, the network 1230 can also be a memory pipe, a hardware connection, or any internal or external communication paths between the components.

The gravity modeling computer 1202 includes a computing system configured to model a rifted continental margin based on gravity data. In some cases, the algorithm of the gravity modeling process can be implemented in an executable computing code, e.g., C/C++ executable codes. Alternatively or in combination, the algorithm of the gravity modeling process can be implemented in an application program, e.g., EXCEL. In some cases, the gravity modeling computer 1202 can include a standalone Linux system that runs batch applications. In some cases, the gravity modeling computer 1202 can include mobile or personal computers that run the application program.

The computer 1202 may comprise a computer that includes an input device, such as a keypad, keyboard, touch screen, microphone, speech recognition device, other device that can accept user information, and/or an output device that conveys information associated with the operation of the computer 1202, including digital data, visual and/or audio information, or a GUI. The input and/or output devices can, for example, via a user interface, receive user input (for example, simulation jobs or user commands) and output the computing results (for example, in graph, table, text, or other formats). For example, the models and simulation results of the rifted continental margin can be saved to and retrieved from network attached storage (NAS). Desktop workstation can be an example frontend input/output devices for simulation jobs submission, and data analysis, and visualization.

The computer 1202 can serve as a client, network component, a server, a database or other persistency, and/or any other component of the system 1200. In some implementations, one or more components of the computer 1202 may be configured to operate within a cloud-computing-based environment.

At a high level, the computer 1202 is an electronic computing device operable to receive, transmit, process, store, or manage data and information associated with the system 1200. According to some implementations, the computer 1202 may also include or be communicably coupled with an application server, e-mail server, web server, caching server, streaming data server, business intelligence (BI) server, and/or other server.

The computer 1202 can receive requests over network 1230 from a client application (e.g., executing on another computer 1202) and respond to the received requests by processing the said requests in an appropriate software application. In addition, requests may also be sent to the computer 1202 from internal users (e.g., from a command console or by another appropriate access method), external or third parties, other automated applications, as well as any other appropriate entities, individuals, systems, or computers.

Each of the components of the computer 1202 can communicate using a system bus 1203. In some implementations, any and/or all the components of the computer 1202, both hardware and/or software, may interface with each other and/or the interface 1204 over the system bus 1203 using an application programming interface (API) 1212 and/or a service layer 1213. The API 1212 may include specifications for routines, data structures, and object classes. The API 1212 may be either computer language-independent or -dependent and refer to a complete interface, a single function, or even a set of APIs. The service layer 1213 provides software services to the computer 1202 and/or the system 1200. The functionality of the computer 1202 may be accessible for all service consumers using this service layer. Software services, such as those provided by the service layer 1213, provide reusable, defined business functionalities through a defined interface. For example, the interface may be software written in JAVA, C/C++, or other suitable language providing data in Extensible Markup Language (XML) format or other suitable format. While illustrated as an integrated component of the computer 1202, alternative implementations may illustrate the API 1212 and/or the service layer 1213 as stand-alone components in relation to other components of the computer 1202 and/or system 1200. Moreover, any or all parts of the API 1212 and/or the service layer 1213 may be implemented as child or sub-modules of another software module, enterprise application, or hardware module without departing from the scope of this disclosure.

The computer 1202 includes an interface 1204. Although illustrated as a single interface 1204 in FIG. 12, two or more interfaces 1204 may be used according to particular needs, desires, or particular implementations of the computer 1202 and/or system 1200. The interface 1204 is used by the computer 1202 for communicating with other systems in a distributed environment—including within the system 1200—connected to the network 1230 (whether illustrated or not). Generally, the interface 1204 comprises logic encoded in software and/or hardware in a suitable combination and operable to communicate with the network 1230. More specifically, the interface 1204 may comprise software supporting one or more communication protocols associated with communications such that the network 1230 or interface's hardware is operable to communicate physical signals within and outside of the illustrated system 1200.

The computer 1202 includes a processor 1205. Although illustrated as a single processor 1205 in FIG. 12, two or more processors may be used according to particular needs, desires, or particular implementations of the computer 1202 and/or the system 1200. Generally, the processor 1205 executes instructions and manipulates data to perform the operations of the computer 1202. Specifically, the processor 1205 executes the functionality required for gravity modeling a rifted continental margin. In some cases, the processor 1205 can include one or more processing cores or any other data processing apparatus. In some implementations, the one or more processing cores can perform one or more of the example processes 200, 300, 400, and 500 individually or collaboratively. The one or more processing cores can perform one or more of the example processes 200, 300, 400, and 500 in sequence or in parallel.

The computer 1202 also includes a memory 1206 that holds data for the computer 1202 and/or other components of the system 1200. Although illustrated as a single memory 1206 in FIG. 12, two or more memories may be used according to particular needs, desires, or particular implementations of the computer 1202 and/or the system 1200. While memory 1206 is illustrated as an integral component of the computer 1202, in alternative implementations, memory 1206 can be external to the computer 1202 and/or the system 1200.

In some implementations, the memory 1206 can include computer-readable medium that include scripts, programs, or other modules that can perform example operations related to gravity modelling a rifted continental margin as described with respect to FIGS. 1-11. In some implementations, the memory 1206 can store survey data that includes the gravity data and density data or other type of data of the rifted continental margin. The memory 1206 can store one or more models and simulation results of the rifted continental margin.

The application 1207 is an algorithmic software engine providing functionality according to particular needs, desires, or particular implementations of the computer 1202 and/or the system 1200, particularly with respect to functionality required for gravity modeling a rifted continental margin. For example, application 1207 can serve provide functionality of one or more operations described in FIGS. 1-11. Further, although illustrated as a single application 1207, the application 1207 may be implemented as multiple applications 1207 on the computer 1202. In addition, although illustrated as integral to the computer 1202, in alternative implementations, the application 1207 can be external to the computer 1202 and/or the system 1200.

There may be any number of computers 1202 associated with, or external to, the system 1200 and communicating over network 1230. Further, the terms "client," "user," and other appropriate terminology may be used interchangeably as appropriate without departing from the scope of this disclosure. Moreover, this disclosure contemplates that many users may use one computer 1202, or that one user may use multiple computers 1202.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS)

receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C/C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented gravity modeling method comprising:
   accessing, by operation of a computer system, survey data that includes gravity data of a rifted continental margin;
   determining, by operation of the computer system, a value of a geometric parameter that corresponds to a desired value of a Mohorovicic Discontinuity (Moho) uplift at a specified location of the rifted continental margin;
   determining, by operation of the computer system, a Moho surface based on a value of Moho uplift at a rift center, the value of Moho uplift at the rift center determined based on the value of the geometric parameter;
   determining, by operation of the computer system, a top basement surface based on a residual gravity data associated with the Moho surface;
   outputting, by operation of the computer system, a crustal model of the rifted continental margin, the crustal model including the Moho surface and the top basement surface of the rifted continental margin; and
   drilling one or more wellbores based on the Moho surface and the top basement surface of the rifted continental margin in the crustal model.

2. The method of claim 1, further comprising:
   calculating a gravity response of the Moho surface; and
   calculating the residual gravity response associated with the Moho surface.

3. The method of claim 1, wherein the value of Moho uplift at the rift center is determined based further on a known depth to the Moho.

4. The method of claim 1, wherein determining a Moho surface based on a value of Moho uplift at a rift center comprises:
   determining a plurality of candidate Moho surfaces based on a plurality of candidate values of Moho uplift at the rift center;
   calculating a plurality of candidate depths to the top basement for the plurality of candidate Moho surfaces; and
   identifying a best candidate Moho surface based on a misfit between the plurality of candidate depths of the top basement and a known depth to the top basement.

5. The method of claim 1, wherein determining a Moho surface based on a value of Moho uplift at a rift center comprises:
   determining a plurality of candidates Moho surfaces based on a plurality of candidate values of Moho uplift at the rift center;
   for each of the plurality of candidate Moho surfaces,
     determining a candidate gravity response of the candidate Moho surface;
     determining a candidate residual gravity data associated with the candidate Moho surface;
     calculating a correlation between the gravity response of the candidate Moho surface and the candidate residual gravity data associated with the candidate Moho surface; and
   identifying a best candidate Moho surface among the plurality of candidate Moho surfaces based on respective correlation coefficients of the plurality of candidate Moho surfaces.

6. The method of claim 1, wherein determining a value of a geometric parameter comprises determining the value of the geometric parameter in an iterative manner.

7. The method of claim 1, wherein the specified location of the rifted continental margin is a continental oceanic boundary or the rift center of the rifted continental margin.

8. The method of claim 1, wherein the depth to Moho surface, denoted as $h_m$, is determined according to:

$$h_m = h_c - h_R\left(\frac{4}{2 - \frac{px}{x_R} + 2e^{\frac{cx}{x_R}} - \frac{px}{x_R}e^{\frac{cx}{x_R}}} - 1\right),$$

where $h_c$ is a base of the crust of the rifted continental margin, $h_R$ is the Moho uplift at the rift center, x is a horizontal distance relative to a baseline, $x_R$ is a distance from the baseline to the rift center, e is the natural logarithm, p is the geometric parameter, and c is a constant value defined as $$c = \ln\left(\frac{p}{2-p}\right).$$

9. A non-transitory computer-readable medium storing instructions executable by a computer system to perform operations comprising:
   accessing, by operation of the computer system, survey data that includes gravity data of a rifted continental margin;
   determining, by operation of the computer system, a value of a geometric parameter that corresponds to a desired value of a Mohorovicic Discontinuity (Moho) uplift at a specified location of the rifted continental margin;
   determining, by operation of the computer system, a Moho surface based on a value of Moho uplift at a rift center, the value of Moho uplift at the rift center determined based on the value of the geometric parameter;
   determining, by operation of the computer system, a top basement surface based on a residual gravity data associated with the Moho surface;
   outputting, by operation of the computer system, a crustal model of the rifted continental margin, the crustal model including the Moho surface and the top basement surface of the rifted continental margin; and
   drilling one or more wellbores based on the Moho surface and the top basement surface of the rifted continental margin in the crustal model.

10. The computer-readable medium of claim 9, the operations further comprising:
   calculating a gravity response of the Moho surface; and
   calculating the residual gravity response associated with the Moho surface.

11. The computer-readable medium of claim 9, wherein the value of Moho uplift at the rift center is determined based further on a known depth to the Moho.

12. The computer-readable medium of claim 9, wherein determining a Moho surface based on a value of Moho uplift at a rift center comprises:
   determining a plurality of candidate Moho surfaces based on a plurality of candidate values of Moho uplift at the rift center;
   calculating a plurality of candidate depths to the top basement for the plurality of candidate Moho surfaces; and
   identifying a best candidate Moho surface based on a misfit between the plurality of candidate depths of the top basement and a known depth to the top basement.

13. The computer-readable medium of claim 9, wherein determining a Moho surface based on a value of Moho uplift at a rift center comprises:
   determining a plurality of candidates Moho surfaces based on a plurality of candidate values of Moho uplift at the rift center;
   for each of the plurality of candidate Moho surfaces,
      determining a candidate gravity response of the candidate Moho surface;
      determining a candidate residual gravity data associated with the candidate Moho surface;
      calculating a correlation between the gravity response of the candidate Moho surface and the candidate residual gravity data associated with the candidate Moho surface; and
   identifying a best candidate Moho surface among the plurality of candidate Moho surfaces based on respective correlation coefficients of the plurality of candidate Moho surfaces.

14. The computer-readable medium of claim 9, wherein determining a value of a geometric parameter comprises determining the value of the geometric parameter in an iterative manner.

15. The computer-readable medium of claim 9, wherein the specified location of the rifted continental margin is a continental oceanic boundary or the rift center of the rifted continental margin.

16. The computer-readable medium of claim 9, wherein the depth to Moho surface, denoted as $h_m$, is determined according to:

$$h_m = h_c - h_R \left( \frac{4}{2 - \frac{px}{x_R} + 2e^{\frac{cx}{x_R}} - \frac{px}{x_R} e^{\frac{cx}{x_R}}} - 1 \right),$$

where $h_c$ is a base of the crust of the rifted continental margin, $h_R$ is the Moho uplift at the rift center, x is a horizontal distance relative to a baseline, $x_R$ is a distance from the baseline to the rift center, e is the natural logarithm, p is the geometric parameter, and c is a constant value defined as $$c = \ln\left(\frac{p}{2-p}\right).$$

17. A system comprising one or more computers that include:
   memory operable to store survey data; and
   data processing apparatus operable to:
      access survey data that includes gravity data of a rifted continental margin;
      determine a value of a geometric parameter that corresponds to a desired value of a Mohorovicic Discontinuity (Moho) uplift at a specified location of the rifted continental margin;
      determine a Moho surface based on a value of Moho uplift at a rift center, the value of Moho uplift at the rift center determined based on the value of the geometric parameter;
      determine a top basement surface based on a residual gravity data associated with the Moho surface;
      output a crustal model of the rifted continental margin, the crustal model including the Moho surface and the top basement surface of the rifted continental margin; and
      drill one or more wellbores based on the Moho surface and the top basement surface of the rifted continental margin in the crustal model.

18. The system of claim 17, wherein the value of Moho uplift at the rift center is determined based further on a known depth to the Moho.

19. The system of claim 17, wherein determining a Moho surface based on a value of Moho uplift at a rift center comprises:
   determining a plurality of candidate Moho surfaces based on a plurality of candidate values of Moho uplift at the rift center;
   calculating a plurality of candidate depths to the top basement for the plurality of candidate Moho surfaces; and
   identifying a best candidate Moho surface based on a misfit between the plurality of candidate depths of the top basement and a known depth to the top basement.

20. The system of claim 17, wherein determining a Moho surface based on a value of Moho uplift at a rift center comprises:
   determining a plurality of candidates Moho surfaces based on a plurality of candidate values of Moho uplift at the rift center;
   for each of the plurality of candidate Moho surfaces,
      determining a candidate gravity response of the candidate Moho surface;
      determining a candidate residual gravity data associated with the candidate Moho surface;
      calculating a correlation between the gravity response of the candidate Moho surface and the candidate residual gravity data associated with the candidate Moho surface; and
   identifying a best candidate Moho surface among the plurality of candidate Moho surfaces based on respective correlation coefficients of the plurality of candidate Moho surfaces.

* * * * *